US008719688B2

(12) United States Patent
Kim

(10) Patent No.: US 8,719,688 B2
(45) Date of Patent: May 6, 2014

(54) DEVICE FOR PROCESSING BOOKMARK INFORMATION GENERATED BY ANOTHER DEVICE AND METHOD FOR DISPLAYING BOOKMARK INFORMATION

(75) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 12/916,343

(22) Filed: Oct. 29, 2010

(65) Prior Publication Data

US 2012/0110425 A1    May 3, 2012

(51) Int. Cl.
*G06F 17/00*     (2006.01)
(52) U.S. Cl.
USPC .......................................... 715/206; 715/722
(58) Field of Classification Search
CPC ............ G06F 17/30017; G06F 3/0481; H04L 65/4084; H04N 21/2387
USPC ....................................................... 715/206
See application file for complete search history.

(56) References Cited

U.S. PATENT DOCUMENTS

| | | | |
|---|---|---|---|
| 2005/0166258 A1* | 7/2005 | Vasilevsky et al. ............ | 725/138 |
| 2005/0246622 A1* | 11/2005 | Ahn et al. .................. | 715/500.1 |
| 2006/0161742 A1* | 7/2006 | Sugimoto et al. ............. | 711/154 |
| 2008/0148333 A1* | 6/2008 | Kim et al. ...................... | 725/116 |
| 2009/0150553 A1* | 6/2009 | Collart et al. .................. | 709/229 |
| 2009/0228569 A1* | 9/2009 | Kalmanje et al. ............. | 709/217 |
| 2010/0042746 A1* | 2/2010 | Keum et al. ................... | 709/245 |
| 2010/0138731 A1* | 6/2010 | Cantegrel ...................... | 715/206 |
| 2011/0107379 A1* | 5/2011 | Lajoie et al. .................... | 725/87 |

FOREIGN PATENT DOCUMENTS

| | | |
|---|---|---|
| KR | 20050081554 | 8/2005 |
| KR | 20070085125 | 8/2007 |
| KR | 20100022326 | 3/2010 |

* cited by examiner

*Primary Examiner* — Doug Hutton, Jr.
*Assistant Examiner* — Ariel Mercado
(74) *Attorney, Agent, or Firm* — Lee, Hong, Degerman, Kang & Waimey

(57) ABSTRACT

An electronic device and method for processing a bookmark are provided. The electronic device includes a receiving unit that receives at least a portion of a bookmark of specific content generated in a first electronic device and a control unit that monitors whether a multimedia player is executed in the electronic device, displays an object including bookmark description information based on the portion of the bookmark if the multimedia player is executed, requests a resume operation to at least a second electronic device storing specific content or a third electronic device storing the bookmark if an input for the resume operation is received via the displayed object, and receives the specific content from the second electronic device. The present invention provides more convenient user interface for seamless content play between at least two electronic playing devices.

10 Claims, 16 Drawing Sheets

Figure 10

| | Information | Example |
|---|---|---|
| Bookmark (a) | Reproduction point state variable | 00:29:39/159frame |
| | Rendering state variable | brightness:8, volume:10, Resolution800*600 |
| | contents identifier | Superman//700.265.584//2010.08.07//8 |
| | Bookmark identifier | Superman//700.265.584//2010.08.07//2010.10.07//5 |
| | Bookmark title \| contents title | Superman//2010.08.07//05:20PM \| Superman |
| | contents storage position | first TV // contents ₩ |
| | Bookmark storage position | first TV // bookmark ₩ |
| Bookmark (b) | Reproduction point state variable | 00:29:39/159frame |
| | Rendering state variable | brightness:8, volume:10, Resolution800*600 |
| | contents identifier | Superman//700.265.584//2010.08.07//8 |
| | Bookmark identifier | Superman//700.265.584//2010.08.07//2010.10.07//5 |
| | Bookmark title \| contents title | Superman//2010.08.07//05:20PM \| Superman |
| | contents storage position | first TV // contents ₩ |
| | Bookmark storage position | first TV // bookmark ₩ |
| | Contents access information | Darling0206//tkfkdgo |
| Bookmark (c) | Contents storage position | first TV // contents ₩ |
| | Rendering state variable | brightness:8, volume:10, Resolution800*600 |
| | contents identifier | Superman//700.265.584//2010.08.07//8 |
| | Bookmark identifier | Superman//700.265.584//2010.08.07//2010.10.07//5 |
| | Bookmark title \| contents title | Superman//2010.08.07//05:20PM \| Superman |
| | Bookmark storage position | first TV // bookmark ₩ |
| Bookmark (d) | stored contents | stored contents |
| | Rendering state variable | brightness:8, volume:10, Resolution800*600 |
| | contents identifier | Superman//700.265.584//2010.08.07//8 |
| | Bookmark identifier | Superman//700.265.584//2010.08.07//2010.10.07//5 |
| | Bookmark title \| contents title | Superman//2010.08.07//05:20PM \| Superman |
| | Bookmark storage position | first TV // bookmark ₩ |

| User | first computer | second computer | first TV | second TV | first mobile terminal | second mobile terminal |
|---|---|---|---|---|---|---|
| User 1 | ○ |  | ○ |  | ○ |  |
| User 2 |  | ○ |  | ○ |  | ○ |

DEVICE FOR PROCESSING BOOKMARK INFORMATION GENERATED BY ANOTHER DEVICE AND METHOD FOR DISPLAYING BOOKMARK INFORMATION

FIELD OF THE INVENTION

The present invention is directed to a bookmark used in electronic devices and, more specifically, to an electronic device receiving a bookmark generated by another electronic device and playing contents based on the bookmark and a method of controlling the electronic device.

DESCRIPTION OF THE RELATED ART

With recent hardware and software developments, electronic devices of different types are often present on a single network. Furthermore, different types of protocols are provided in the electronic devices in order to enable communication between the electronic devices. A method is required for effectively managing contents between electronic devices in a network environment in order to improve enjoyment of users.

SUMMARY OF THE INVENTION

In one aspect of the present invention, a method for processing a bookmark in an electronic device is provided. The method includes receiving information related to the bookmark generated by a different electronic device, the bookmark related to contents output by the different electronic device and requesting execution of the bookmark in the electronic device based on the information related to the bookmark when a specific condition is satisfied, wherein requesting execution of the bookmark includes receiving the contents to which the generated bookmark is related.

It is contemplated that the method further includes storing information related to the generated bookmark in a server, wherein requesting execution of the bookmark further includes obtaining the contents to which the generated bookmark is related from the server. It is further contemplated that the method further includes storing information related to the generated bookmark in the different electronic device, wherein requesting execution of the bookmark further includes obtaining the contents to which the generated bookmark is related from the different electronic device.

It is contemplated that the method further includes determining if time information related to the contents is available, storing the contents if the time information is not available and not storing the contents if the time information is available. It is further contemplated that determining if time information related to the contents is available includes determining if a reproduction state variable is received.

It is contemplated that requesting execution of the bookmark further includes providing a user interface upon receiving the information related to the bookmark and requesting execution of the bookmark according user input received via the user interface. It is further contemplated that the contents to which the generated bookmark is related are transcoded before the contents are received.

It is contemplated that the method further includes transcoding the contents to which the generated bookmark is related in the electronic device after the contents are received. It is further contemplated that the electronic device and the different electronic device each are a computer, a television, a cellular phone, a home appliance, a digital broadcasting terminal, a personal digital assistant (PDA), a portable multimedia player (PMP), a navigation system or a mobile Internet device. Preferably, the electronic device and the different electronic device use different protocols and receiving the information and the contents in the electronic device includes protocol conversion.

In another aspect of the present invention, an electronic device for processing a bookmark is provided. The electronic device includes a receiving unit configured to receive information related to the bookmark generated by a different electronic device, the bookmark related to contents output by the different electronic device and a control unit configured to request execution of the bookmark in the electronic device based on the information related to the bookmark when a specific condition is satisfied, wherein requesting execution of the bookmark includes receiving the contents to which the generated bookmark is related.

It is contemplated that information related to the generated bookmark is stored in a server and the controller is further configured to request execution of the bookmark by obtaining the contents to which the generated bookmark is related from the server. It is further contemplated that information related to the generated bookmark is stored in the different electronic device and the controller is further configured to request execution of the bookmark by obtaining the contents to which the generated bookmark is related from the different electronic device.

It is contemplated that the controller is further configured to determine if time information related to the contents is available, store the contents if the time information is not available and not store the contents if the time information is available. It is further contemplated that determining if time information related to the contents is available includes determining if a reproduction state variable is received.

It is contemplated that the controller is further configured to request execution of the bookmark by providing a user interface upon receiving the information related to the bookmark and requesting execution of the bookmark according user input received via the user interface. It is further contemplated that the contents to which the generated bookmark is related are transcoded the before the contents are received.

It is contemplated that the electronic device further includes a transcoding unit configured to transcode the contents to which the generated bookmark is related after the contents are received. It is further contemplated that the electronic device and the different electronic device each are a computer, a television, a cellular phone, a home appliance, a digital broadcasting terminal, a personal digital assistant (PDA), a portable multimedia player (PMP), a navigation system or a mobile Internet device. Preferably, the electronic device and the different electronic device use different protocols and receiving the information and the contents in the electronic device includes protocol conversion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 10 illustrates exemplary bookmarks generated according to an embodiment of the present invention.

DETAILED DESCRIPTION OF THE PREFERRED EMBODIMENTS

Figure 1:
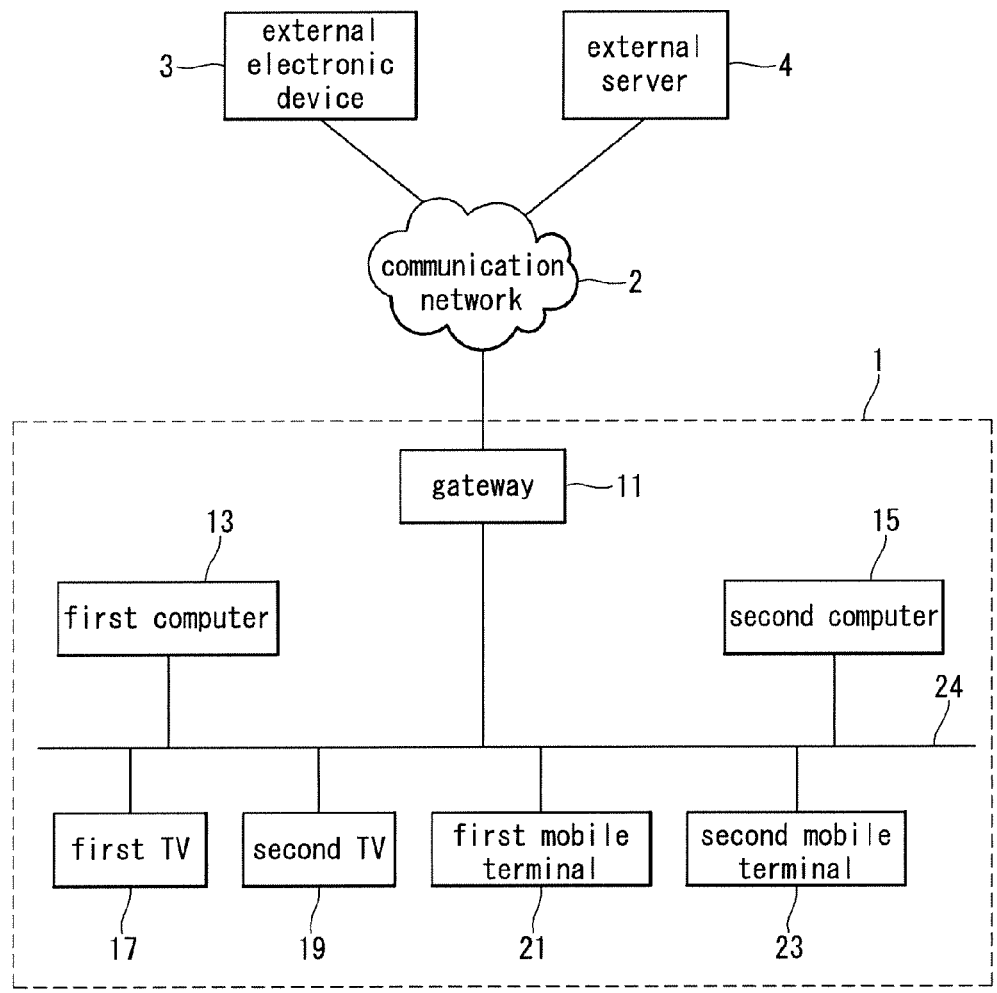
FIG. 1 illustrates a system environment according to the present invention.

The above-described objects, characteristic and advantages of the present invention will be more apparent through the attached drawings and the following detailed description. Hereinafter, the present invention will be described in detail by explaining preferred embodiments of the invention with reference to the attached drawings. Like reference numerals in the drawings denote like elements. In the following description of the present invention, a detailed description of known functions and configurations incorporated herein will be omitted when it may obscure the subject matter of the present invention.

FIG. 1 illustrates a system environment according to the present invention. The system environment may include a network 1, a communication network 2, an external electronic device 3, and an external server 4.

The network 1 may be a network to which electronic devices 13, 15, 17, 19, 21, 23, 25 are linked. The network 1 may be a local network. The network 1 may include a home network and a social network, for example. For convenience of explanation, the network 1 is assumed to be a home network.

A common protocol or different protocols may be used for communication between electronic devices 13, 15, 17, 19, 21, 23 in the network 1. For example, the protocol may include at least universal plug and play (UPnP), digital living network alliance (DLNA), living network control protocol (LNCP), or power line communication (PLC). The protocol used in the network 1 is not limited to these protocols. When two of more of the electronic devices 13, 15, 17, 19, 21, 23 use different protocols, the electronic devices can communicate with each other through protocol conversion.

The network 1 may include a gateway 11, electronic devices 13, 15, 17, 19, 21, 23 and a transmission medium 24. The electronic devices may include first and second computers 13 and 15, first and second TVs 17 and 19, and first and second mobile terminals 21 and 23, for example. Furthermore, the network 1 may further include various devices such as digital broadcasting terminals, personal digital assistants (PDA), portable multimedia players (PMP), navigation systems, or mobile Internet devices (MID) in addition to the electronic devices. The number of electronic devices included in the network 1 may be arbitrary.

The gateway 11 may have a function for accessing the communication network 2. The first and second computers 13 and 15 may have functions of controlling the network 1, playing contents and storing contents. A computer having better performance amongst the first and second computers 13 and 15 may be designated as a main computer.

The first and second TVs 17 and 19 may have a function of playing contents. The first and second TVs 17 and 19 may include an analog TV and/or a digital TV.

The first and second mobile terminals 21 and 23 may include various electronic devices conveniently carried by users. For example, the mobile terminals 21 and 23 may include cellular phones or PMP.

The transmission medium 24 may link electronic devices of the same type or different types to the gateway 11. The transmission medium 24 may include wired and wireless media. For example, the transmission medium 24 may be a power line, WI-FI or Bluetooth™

Although FIG. 1 illustrates only a single transmission medium 24, the electronic devices 13, 15, 17, 19, 21, 23 may be linked through different transmission media. The electronic devices connected to different transmission media may use a common protocol. In addition, when the electronic devices use different protocols, they can communicate with each other by adapting the different protocols The communication network 2 may provide a function of linking the network 1 to an external network. The external network may include the external electronic device 3 and the external server 4, for example. The communication network 2 may include wired/wireless Internet, a mobile communication network, or a broadcasting network.

The external electronic device 3 may be a device that is not directly linked to the network 1. For example, the external electronic device 3 may be a device that is not directly linked to the network 1 but can be connected to the network such as the first TV 17 linked through the communication network 2.

Furthermore, the external electronic device 3 may remotely control the network 1 or receive a remote control signal from the network 1. For example, the external electronic device 3 may be a mobile terminal that is not linked to the network 1, such as an out-of home mobile terminal.

The external server 4 may provide contents to the network 1. For example, the external server 4 provides real-time contents and/or contents stored in the external server to the network 1 through the communication network 2. Furthermore, the external server 4 may provide contents in a streaming mode and/or a downloading mode. The external sever 4 may include a broadcasting station.

Figure 2:
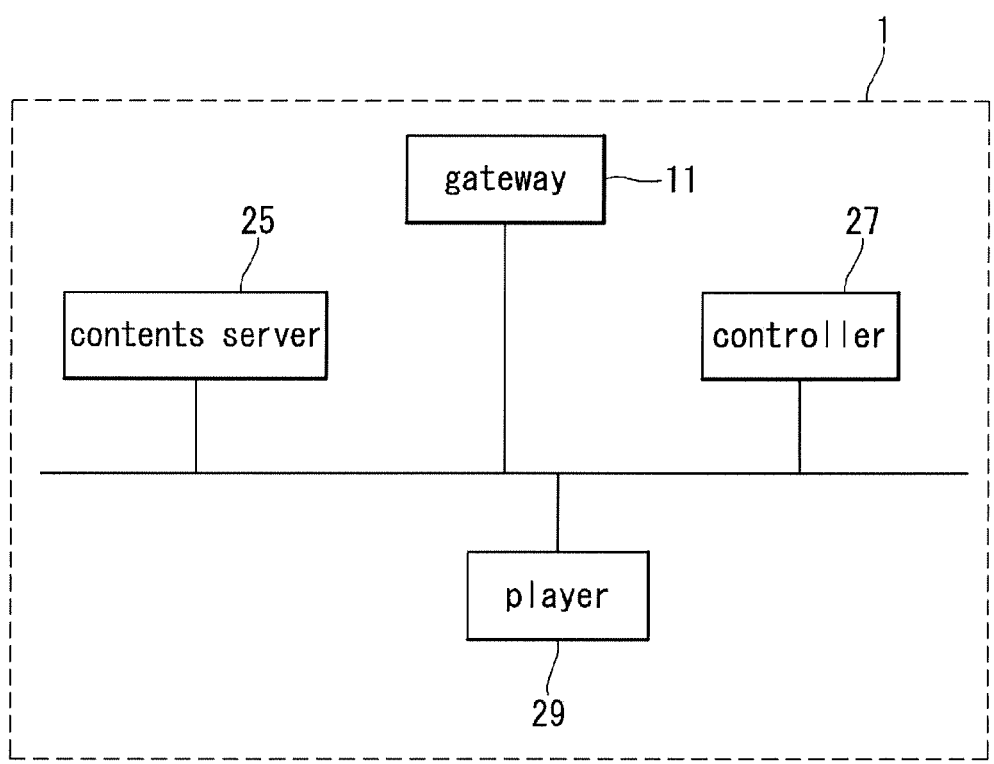
FIG. 2 illustrates a network according to an embodiment of the present invention.

FIG. 2 illustrates a network 1 according to an embodiment of the present invention. Electronic devices 13, 15, 17, 19, 21, 23 in the network 1 may be classified by function. As illustrated in FIG. 2, the electronic devices in the network may be classified as a contents server 25, a controller 27, or a player 29.

The contents server 25 may store contents and manage the stored contents. The contents server 25 may receive various commands from the controller 27 and execute the received commands. If the contents server 25 receives a play command, for example, it can search for contents to be played and provide the searched contents to the player 29.

The contents server 25 can include any electronic device that stores contents. For example, the contents server 25 may include the first and second computers 13 and 15, the first and second TVs 17 and 19, and the first and second mobile terminals 21 and 23 illustrated in FIG. 1.

The controller 27 may have a function of controlling the contents server 25 and/or the player 29. The controller 27 can include any electronic device having a control function. For example, the controller 27 may include the first and second computers 13 and 15, the first and second TVs 17 and 19, and the first and mobile terminals 21 and 23.

The player 29 may have a function of outputting contents. The player 29 can include any electronic device having a function of outputting contents. For example, the player 29 may include the first and second computers 13 and 15, the first and second TVs 17 and 19, and the first and second mobile terminals 21 and 23.

The electronic devices 13, 15, 17, 19, 21, 23 may correspond to at least the contents server 25, the controller 27, or the player 29 according to their function. If the first computer 13 has functions of storing, controlling and outputting contents, it may correspond to the contents server 25, the controller 27, and the player 29.

The first and second computers 13 and 15, the first and second TVs 17 and 19, and the first and second mobile terminals 21 and 23 will now be explained in more detail with reference to the attached drawings. In the following description, suffixes "module" and "unit" are given to components of a mobile terminal in consideration of only facilitation of description and do not have different meanings or functions.

Figure 3:
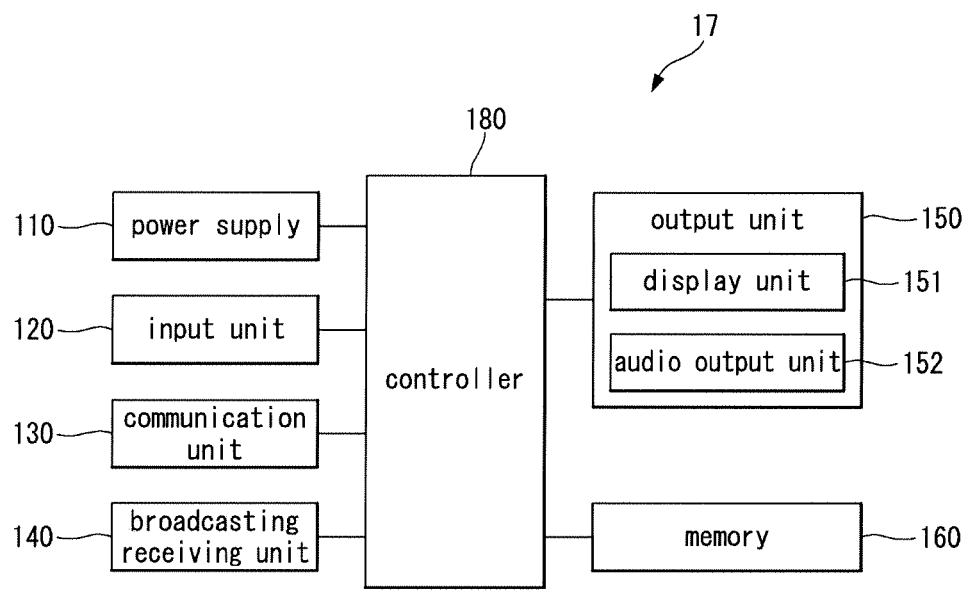
FIG. 3 is a block diagram of a first TV according to an embodiment of the present invention.

FIG. 3 is a block diagram of the first TV 17 according to an embodiment of the present invention. The first TV 17 may include a power supply 110, an input unit 120, a communication unit 130, a broadcast receiving unit 140, an output unit 150, a memory 160, and a controller 180. The components of the first TV 17 are not limited to these elements and the first TV may include only some of these elements or further include other components in addition to these elements. The second TV 19 may include the same configuration as the first TV 17.

The power supply 110 receives external power and/or auxiliary power and provides power required to operate the components of the first TV 17. A user generates input data for controlling the operation of the first TV 17 through the input unit 120.

The communication unit 130 may include at least one module for allowing the first TV 17 to communicate with other electronic devices. For example, the communication unit 130 may receive or transmit data from or to the first computer 13, the second computer 15, the second TV 19, the first mobile terminal 21, the second mobile terminal 23, the external electronic device 3, and the external server 4. The communication unit may use wired communication methods, such as Ethernet and PLC, or wireless communication methods, such as Zigbee™ Furthermore, the communication unit 130 may include not only the current communication means but also communication means that will be used in the future.

The controller 180 may process data received through the communication unit 130. The broadcast receiving unit 140 receives broadcasting signals and/or broadcasting associated information from an external broadcasting management server through a broadcasting channel.

The broadcasting channel may include a satellite channel and/or a terrestrial channel. The broadcasting management server may correspond to a server that generates and transmits broadcasting signals and/or broadcasting associated information or a server that receives previously generated broadcasting signals and/or broadcasting related information and transmits the received broadcasting signals and/or broadcasting related information to terminals such as the first and second TVs 17 and 19. The broadcasting signals and/or broadcasting associated information received through the broadcast receiving unit 140 may be stored in the memory 160

The first TV 17 may not include the broadcasting receiving unit 140. The broadcast receiving unit 140 may be provided as an element independent of the first TV and may communicate with the first TV in a wired/wireless manner. The controller 180 may process data received through the broadcast receiving unit 140. For example, the broadcast receiving unit 140 may be included in a set-top-box (not shown) connected to the first TV 17 and the first TV may receive data from the set-top-box through the communication unit 130.

The output unit 150 generates a visual, auditory or tactile output and may include a display unit 151 and an audio output unit 152. In addition, the output unit 150 may further include a haptic module (not shown) for generating the tactile output, as such as vibration.

The display unit 151 displays information processed in the first TV 17. The display unit 151 may include a liquid crystal display, a thin film transistor-liquid crystal display, an organic light-emitting diode, a flexible display, or a 3D display. The first TV 17 may include two or more display units 151.

The audio output unit 152 outputs audio data received from an external device or generated by the first TV 17. The audio output unit 152 may output audio signals related to functions executed in the first TV 17. The audio output unit 152 may include a speaker or a buzzer. Furthermore, the audio output unit 152 may output sound through an earphone jack. A user can connect an earphone to the earphone jack and hear the sound.

The memory 160 may store programs for the operation of the controller 180 and temporarily or permanently store input/output data, such as audio data, still images, moving images, and broadcasting related information. Contents described in this document may include the above data.

The memory 160 may include at least a flash memory, a hard disc, a multimedia card micro type, a card type memory (for example, SD or XD memory), random access memory (RAM), static RAM (SRAM), read-only memory (ROM), electrically erasable programmable read-only memory (EERROM), programmable read-only memory (PROM), a magnetic memory, a magnetic disc, or an optical disc. The memory 160 may be provided as an element independent of the first TV 17. For example, a digital video recorder (DVR) independent of the first TV 17 may function as the memory 160.

The controller 180 controls the overall operation of the first TV 17. For example, the controller 180 performs control and processing relating to broadcasting receiving, broadcasting recording, and Internet access.

For a hardware implementation, the embodiments of the present invention can be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for executing functions.

For software implementation, embodiments such as procedures or functions can be implemented with a separate software modules executing at least one function or operation. Software codes can be implemented according to a software application written in an appropriate software language. Furthermore, the software codes can be stored in the memory 160 and executed by the controller 180.

Figure 4:
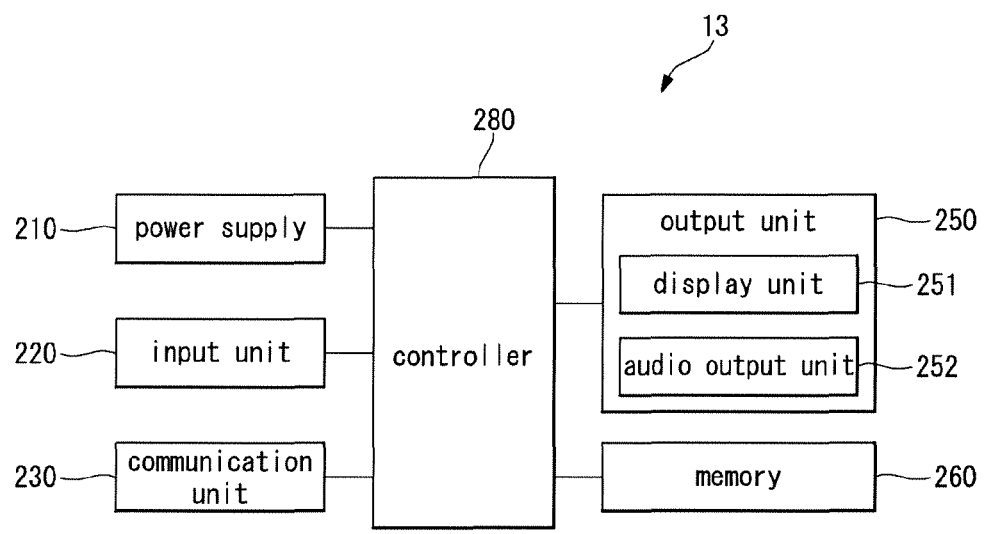
FIG. 4 is a block diagram of a first computer according to an embodiment of the present invention.

FIG. 4 is a block diagram of the first computer 13 according to an embodiment of the present invention. As illustrated in FIG. 4, the first computer 13 may include at least one of a power supply 210, an input unit 220, a communication unit 230, an output unit 250, and a memory 260. The components of the first computer 13 are not limited to these elements and the first computer may include some of these elements or further include other elements.

Components of the first computer 13 and the first TV 17, which have similar names, may perform similar functions. The first computer 13 may further include a component corresponding to the broadcasting receiver 140 included in the first TV 17. The second computer 15 may have the same configuration as the first computer 13.

Figure 5:
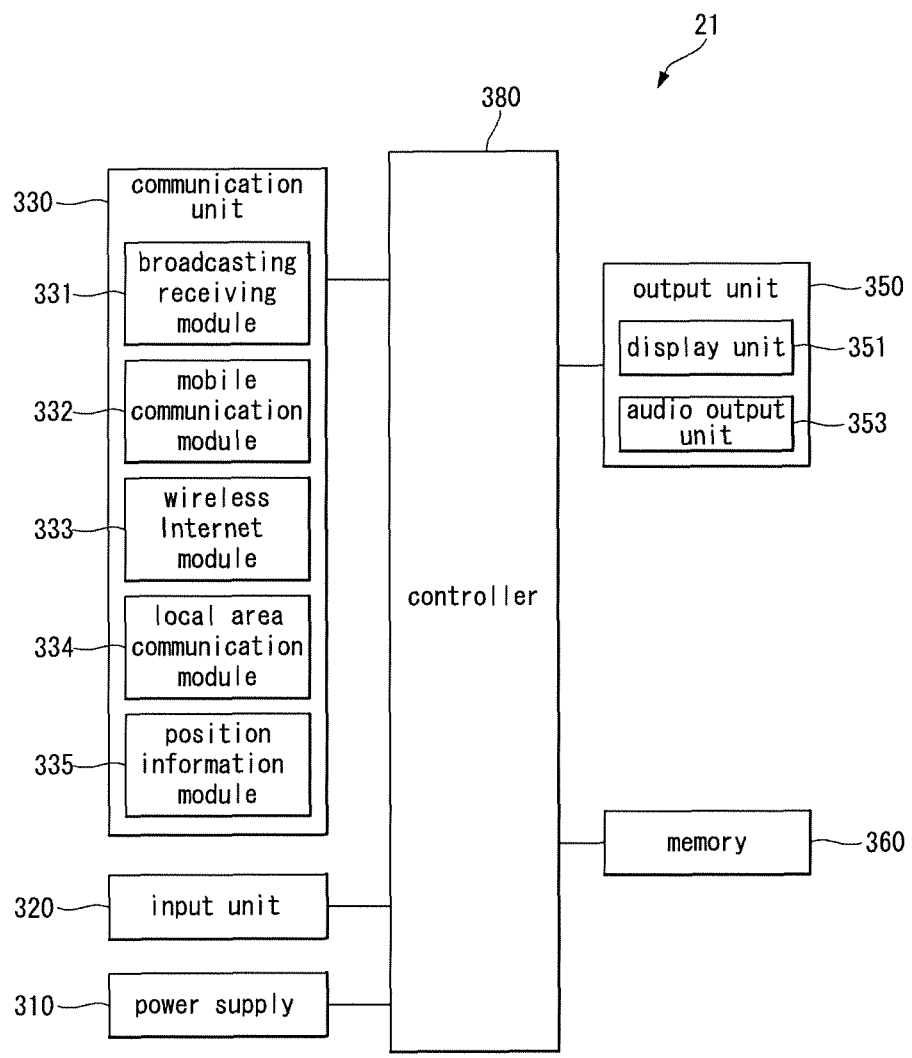
FIG. 5 is a block diagram of a first mobile terminal according to an embodiment of the present invention.

FIG. 5 is a block diagram of the first mobile terminal 21 according to an embodiment of the present invention. The second mobile terminal 23 may include the components of the first mobile terminal 21

As illustrated in FIG. 5, the first mobile terminal 21 may include a power supply 310, an input unit 320, a communication unit 330, an output unit 350, and a memory 360. The components of the first mobile terminal 21 are not limited to these elements and the first mobile terminal may include some of these elements or further include elements in addition to these elements. Components of the first mobile terminal 13 and the first TV 17 that have similar names may perform similar functions.

The communication unit 330 may include at least one module that enables communication between devices. For example, the communication unit 330 may include a broadcasting receiving module 331, a mobile communication module 332, a wireless Internet module 333, a local area communication module 334, and a position information module 335.

The broadcasting receiving module 331 receives broadcasting signals and/or broadcasting related information from an external broadcasting management server through a broadcasting channel. The broadcasting signals and/or broadcasting related information received through the broadcasting receiving module 331 may be stored in the memory 360.

The broadcasting channel may include a satellite channel and a terrestrial channel. The broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals and data broadcasting signals but also signals in the form of a combination of a TV broadcasting signal and a radio broadcasting signal. The broadcasting related information may be information related to a broadcasting channel, a broadcasting program or a broadcasting service provider.

The broadcasting related information may be provided via a mobile communication network. In this case, the broadcasting related information may be received by the mobile communication module 332.

The broadcasting related information may exist in various forms. For example, the broadcasting related information may exist in the form of electronic program guide (EPG) of digital multimedia broadcasting (DMB) or in the form of electronic service guide (ESG) of digital video broadcast-handheld (DVB-H).

The broadcasting receiving module 331 receives broadcasting signals using various broadcasting systems. Specifically, the broadcasting receiving module 331 may receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 331 may be suited to broadcasting systems providing broadcasting signals other than the above-described digital broadcasting systems.

The mobile communication module 332 transmits/receives a radio signal to/from at least one of a base station, an external terminal and a server on a mobile communication network. The radio signal may include a voice call signal, a video telephony call signal or data in various forms according to transmission and reception of text/multimedia messages.

The wireless Internet module 333 is a module for wireless Internet access and may be included in the first mobile terminal 21 or externally attached to the first mobile terminal. Wireless LAN (WLAN) (Wi-Fi), wireless broadband (Wibro), world interoperability for microwave access (Wimax), high speed downlink packet access (HSDPA) and so on may be used as a wireless Internet technique.

The local area communication module 334 is a module for local area communication. Bluetooth™, radio frequency identification (RFID), infrared data association (IrDA), ultra wideband (UWB) and ZigBee™ can be used as a local area communication technique.

The position information module 335 confirms or obtains the position of the first mobile terminal 21. The position information module 335 may obtain position information by using a global navigation satellite system (GNSS).

The GNSS is a terminology describing a radio navigation satellite system that revolves round the earth and transmits reference signals to predetermined types of radio navigation receivers such that the radio navigation receivers can determine their positions on the earth surface or near the earth surface. The GNSS may include a global positioning system (GPS) of the United States, Galileo of Europe, global orbiting navigational satellite system (GLONASS) of Russia, COMPASS of China, and quasi-zenith satellite system (QZSS) of Japan.

The position information module 335 may be a GPS module. The GPS module may calculate information on distances between one point or object and at least three satellites and information related to a time when the distance information is measured and apply trigonometry to the obtained distance information to obtain three-dimensional position information on the point or object according to latitude, longitude and altitude at a predetermined time. Furthermore, a method of calculating position and time information using three satellites and correcting the calculated position and time information using another satellite is also used. The GPS module may continuously calculate the current position in real time and calculate velocity information using the position information.

Figure 6:
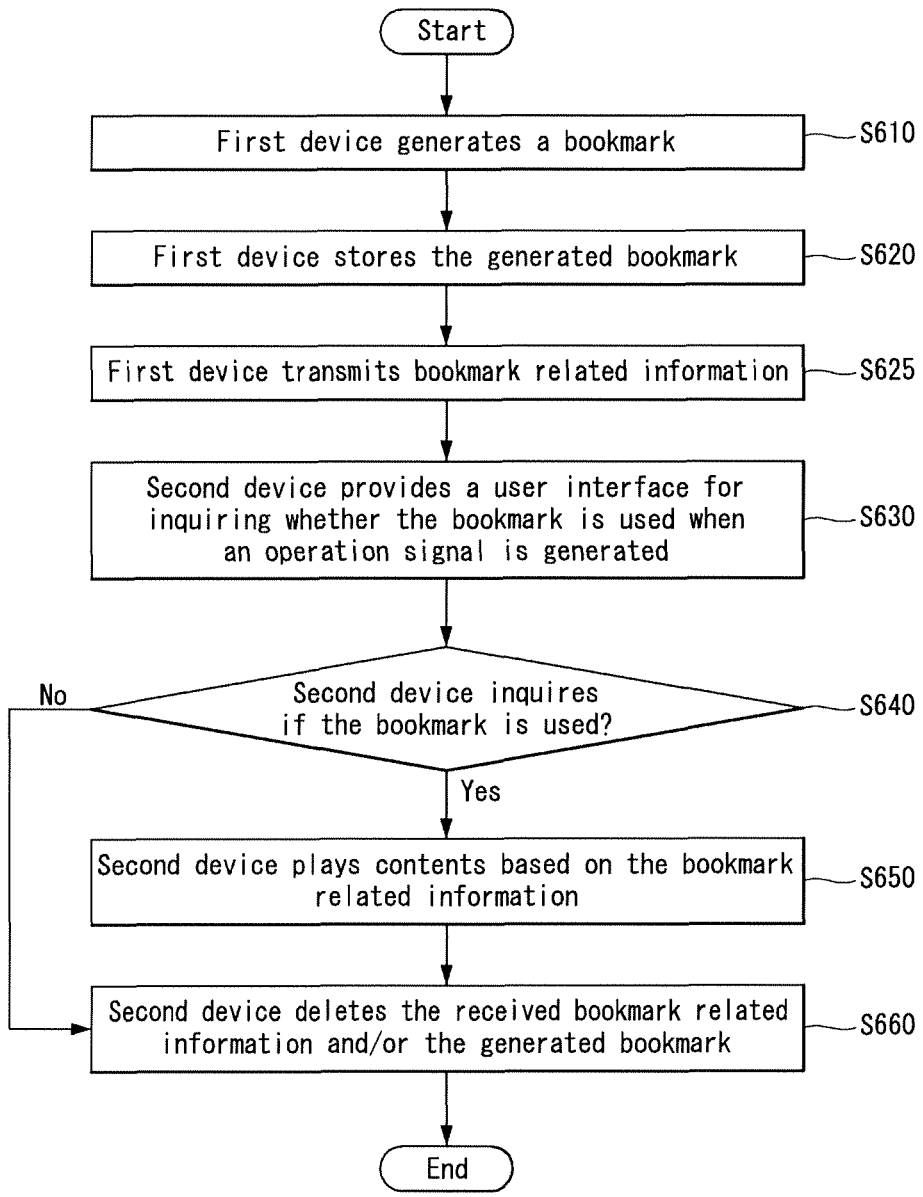
FIG. 6 is a flowchart showing a method of controlling an electronic device according to an embodiment of the present invention.

FIG. 6 is a flowchart illustrating a method of controlling an electronic device according to an embodiment of the present invention. The method illustrated in FIG. 6 is described with reference to FIGS. 7 through 15. The method of controlling an electronic device shown in FIG. 6 may be performed in the environment and with the electronic devices illustrated in FIGS. 1-5.

As illustrated in FIG. 6, the method includes a first device generating a bookmark (S610), the first device storing the generated bookmark (S620), the first device transmitting bookmark related information (S625), the second device providing a user interface for inquiring whether to use the bookmark when an operation signal is generated (S630), the second device determining whether to use the bookmark (S640), the second device playing contents based on bookmark related information when it is determined that the bookmark is used (S650) and the second device deleting at least the bookmark related information or the generated bookmark (S660).

Each of the electronic devices 13, 15, 17, 19, 21 and 23 may generate bookmarks with respect to contents currently output from any of the electronic devices (S610). It is assumed that the first TV 17 plays contents via the output unit 150 and generates a bookmark with respect to the contents for convenience of explanation. However, the present invention is not limited to a specific device.

Contents described in this document may include various contents. For example, the contents may include multimedia contents, texts, still images, moving images, animation, broadcasting contents, and applications.

The first TV 17 may receive contents from various sources. The sources may include an internal or external electronic device of the network 1. The internal electronic device of the network 1 may include at least the electronic devices 13, 15, 17 19, 21 and 23. The external electronic device of the network 1 may include at least the external electronic device 3 or the external server 4. The first TV 17 may output contents stored in the memory 160 via the output unit 150.

The controller 180 included in the first TV 17 generates a bookmark with respect to the contents currently played by the first TV 17 (S610). For example, a user may generate a bookmark with respect to the currently played contents via the input unit 120. The bookmark may be generated from various motives.

The bookmark described in this document may be a bookmark of a certain point in the contents while the contents are being played. The user can generate the bookmark while watching the contents in order to watch the contents from the bookmarked point by using the generated bookmark.

Figure 7:
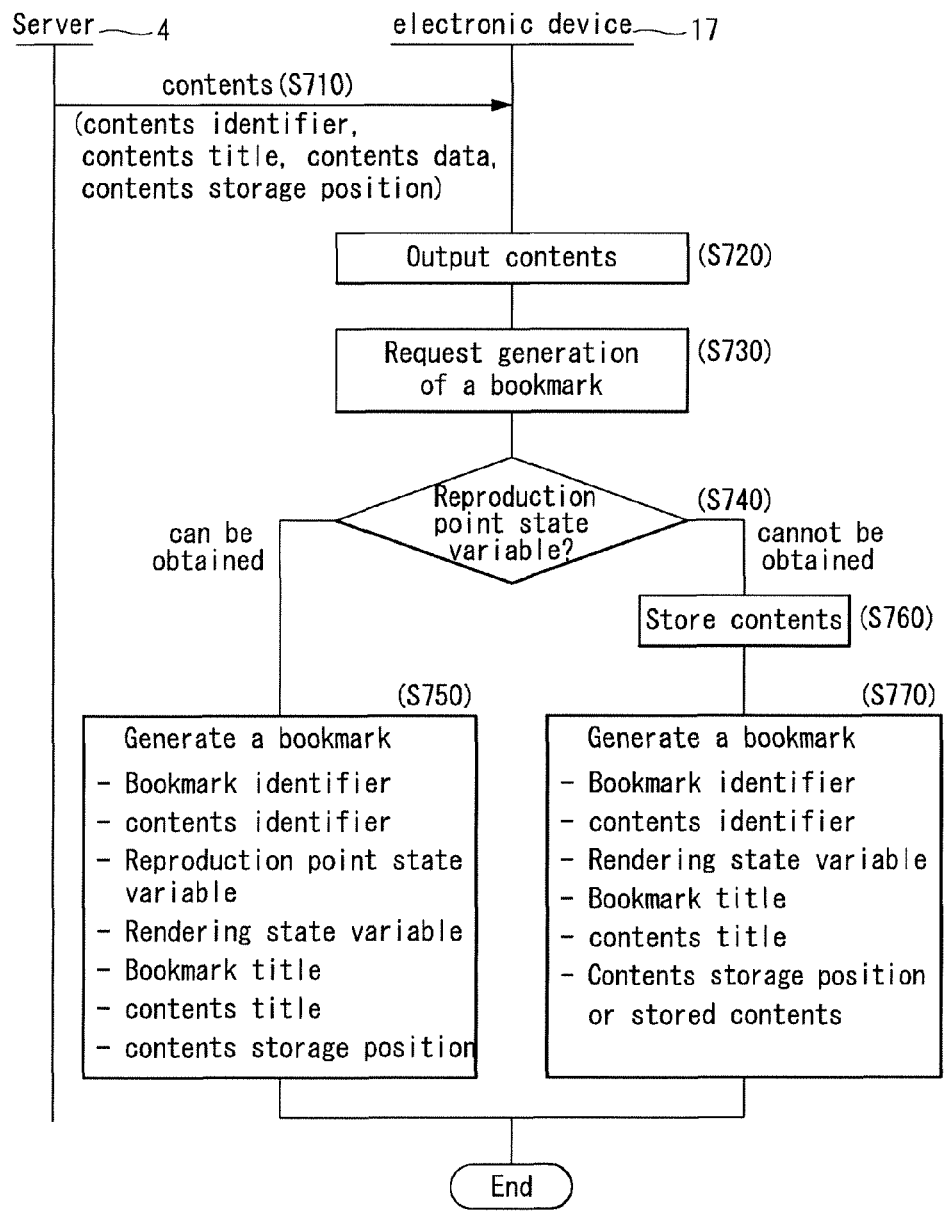
FIG. 7 is a flowchart illustrating a method of generating a bookmark according to an embodiment of the present invention.

FIGS. 7-10 illustrate generating and storing a bookmark according to an embodiment of the present invention. FIG. 7 is a flowchart illustrating generating a bookmark according to an embodiment of the present invention. It is assumed that the electronic device illustrated in FIG. 7 corresponds to the first TV 17 and the server illustrated in FIG. 7 corresponds to an electronic device storing contents.

The first TV 17 receives contents from the server (S710). The contents may include at least contents data, a contents title, a contents identifier, or information about the position in which the contents are stored (referred to as contents storage position information hereinafter).

The contents data may be a media file or a media stream that can be reproduced by the first TV 17. As used herein, to play and output contents means to reproduce and output contents data.

The contents title, the contents identifier, and the contents storage position information may be metadata related to the contents data and may be transmitted to the first TV 17 together with the contents data or may be transmitted independent of the contents data. The contents title, the contents identifier, and the contents storage position information may be information used to generate a bookmark. The contents title, the contents identifier, and the contents storage position information will be described in detail later.

The first TV 17 outputs the received contents via the output unit 150 (S720). The contents may be stored in the memory 160 of the first TV 17 or an electronic device independent of the first TV. When the contents are stored in the memory 160 of the first TV 17, the first TV simultaneously provides a server function and a player function.

The first TV 17 receives a bookmark generation request while playing the contents (S730). The first TV 17 determines whether a state variable with respect to a reproduction point of the currently played contents can be obtained (S740).

The reproduction point state variable may represent the quantity of contents that have been played. The reproduction point state variable will be described in detail later.

The first TV 17 may obtain the reproduction point state variable from metadata of the received contents or the first TV may request the server providing the contents to transmit the reproduction point state variable. When the contents are stored in the first TV 17, the first TV can obtain the reproduction point state variable from itself.

The first TV 17 generates the bookmark when the first TV can obtain the reproduction point state variable (S750). The first TV 17 can directly generate the bookmark for the contents or instruct another electronic device, such as the electronic device providing the contents, to generate the bookmark.

The first TV 17 may generate the bookmark by obtaining or generating at least a contents title, a contents identifier, a bookmark title, a bookmark identifier, a reproduction point state variable, a rendering state variable, a contents storage position, or the identifier of an electronic device that will output the bookmarked contents. This information is not essential and the bookmark may include only some of the information or further include other information.

The contents title represents the title of the currently output contents. The controller 180 of the first TV 17 may obtain the contents title through the metadata of the contents, such as via the received contents (S710). The contents title may be obtained from an electronic program guide (EPG).

The contents identifier may be information for identifying the bookmarked contents. The contents identifier may designate the contents to be played when the contents are played based on the bookmark.

The controller 180 of the first TV 17 may obtain the contents identifier through various methods. For example, the controller 180 of the first TV 17 may obtain the contents identifier from the metadata of the currently output contents.

The controller 180 of the first TV 17 may arbitrarily generate the contents identifier. For example, when the contents identifier obtained through the metadata is identical to the contents identifier of other contents, the first TV 17 may generate the contents identifier such that when the contents identifier of contents received from an external device of the network 1 is identical to the contents identifier of contents of an internal device of the network, the first TV can generate a contents identifier for discriminating the contents from each other.

The controller 180 of the first TV 17 may generate the contents identifier based on at least the contents title, a contents file size, a contents creating date, or a contents serial number. When the title of the bookmarked contents is "superman," for example, the controller 180 of the first TV 17 can use the contents title as the contents identifier.

The controller 180 of the first TV 17 may use at least the contents file size and the contents creating date to generate the contents identifier. The contents file size or the contents creating date can identify the bookmarked contents when there are contents having the same contents title as the bookmarked contents and a file different from the bookmarked contents.

The contents identifier includes the contents title, the file size of the bookmarked contents, and the bookmarked contents creating date. Therefore, the contents identifier can identify the bookmarked contents. For example, the contents identifier may include information "superman(contents title)//700,265,584 bytes(file size)//2010.08.07(creating date)" to identify the bookmarked contents. The controller 180 of the first TV 17 may obtain the contents title, the file size of the bookmarked contents, and the bookmarked contents creating date from tag data of the currently output contents.

The contents identifier may include a serial number given to each of the contents. For example, the serial number may be given by the electronic device that manages the network 1 and may be stored in the metadata of the contents. When new contents are discovered, the electronic device that manages the network 1 may allocate a new serial number to the new contents. Accordingly, it is possible to generate contents identifiers such that the contents identifier of contents of an internal device of the network 1 is different from the contents identifier of contents of an external device of the network.

The bookmark title corresponds to the title of the bookmark and may allow the user to conveniently search for the bookmark. The first TV 17 may receive the bookmark title from the user or generate the bookmark title according to a predetermined method.

For example, the controller 180 of the first TV 17 can arbitrarily generate the bookmark title based on the contents title. When the contents title is "superman" the bookmark title may be "superman(contents title)//2010.08.07(bookmark generating date)//05:20 PM(bookmark generating time)." This is an example of the bookmark title and can include any information that can provide convenience to the user when the user searches for the bookmark.

The bookmark identifier may be information for identifying the generated bookmark. The controller 180 of the first TV 17 may set the bookmark identifier as a unique value in the network 1. Accordingly, the bookmark can be differentiated from other bookmarks.

The bookmark identifier may be generated by the controller 180 of the first TV 17. The controller 180 of the first TV 17 may generate the bookmark identifier based on at least the contents identifier or the bookmark title.

For example, the bookmark identifier can be generated based on the contents identifier. The bookmark identifier can include at least bookmark generating date related information or information indicating that the bookmark was generated in the nth order on the bookmark generating date.

The bookmark identifier can have information on the bookmark generating date "2010.10.07" and information indicating that the bookmark was generated in the nth order on the bookmark generating date "2010.10.07," which are included in the contents identifier "superman(contents title), 700,265, 584 bytes(file size), 2010.08.07 (contents creating date)."

The controller 180 of the first TV 17 may inquire of another electronic device, for example, the electronic device that administrates the network 1, about the information indicating that the bookmark was generated in the nth order on the bookmark generating date. Furthermore, the controller 180 of the first TV 17 may use serial numbers of a bookmark generated in the network 1 to generate the bookmark identifier.

For example, if one hundred bookmarks have been generated in the network 1 up to a preset time, the controller 180 can increment the last serial number and use 101 as the serial number of the newly generated bookmark identifier. To achieve this, the controller 180 can obtain the serial number of the last generated bookmark in the network 1 to generate the new bookmark identifier such that the new bookmark identifier is unique in the network. The controller 180 of the first TV 17 may inquire of another electronic device, for example, the electronic device that manages the network 1, about the serial number of the last generated bookmark.

The reproduction point state variable may be information about a reproduction point that indicates the quantity of contents that have been played. The first TV 17 may obtain the reproduction point state variable from the received contents. Otherwise, the first TV 17 may obtain the reproduction point state variable from the server providing the contents by requesting the server to provide the reproduction point state variable.

For example, the reproduction point may be defined based on a contents play time and the number of frames of the contents and may be 00:29:39 seconds. This indicates that 29 minutes 39 seconds have elapsed from the starting point of the currently output contents. The reproduction point state variable may be 159 frames. This indicates that the bookmark is generated when 159th frame of the contents is reproduced.

The reproduction point state variable may include at least channel information or broadcasting time. For example, the reproduction point state variable may have a structure of "CH9(channel information)//14:13:00(broadcasting time)."

The rendering state variable may include information about the environment in which the contents are played. The rendering state variable can include any environment related to playback of the contents, such as brightness or volume. For example, the rendering state variable can include information of brightness of 8, volume of 10, and resolution of 800×600.

The controller 180 of the first TV 17 can obtain the rendering state variable for the playback environment of the contents and generate the bookmark in order to provide the same playback environment when the user plays the bookmarked contents later. The first TV 17 can obtain the rendering state variable from the first TV 17 currently outputting the contents.

The controller 180 of the first TV 17 can obtain the contents storage position through the metadata of the contents. The contents storage position may allow the bookmarked contents to be easily searched. The contents storage position may include at least a contents folder or the identifier of the electronic device in which the contents are stored.

When the contents currently output from the first TV 17 are stored in the memory 160 of the first TV 17, the contents storage position may correspond to "First TV(identifier of the electronic device storing the contents)//contents\(contents folder)." When the contents currently output from the first TV 17 are streamed from another electronic device included in the network 1, such as the second computer 15, the contents storage position can correspond to "Second computer//contents\."

When the contents are received from an external server 4 of the network 1, the contents storage position may be indicated as the address of the external server, such as the IP address of the external server. For example, the contents storage position can be "200.222.255.2 (IP address of the external server)//contents\."

Referring again to FIG. 7, when the first TV 17 determines that the reproduction point state variable cannot be obtained (S740), the first TV 17 may store the contents (S760) and generate the bookmark (S770). The first TV 17 cannot obtain the reproduction point state variable when the received contents correspond to a broadcasting signal, for example. The first TV 17 may store the received contents according to a time shift function.

Figure 9:
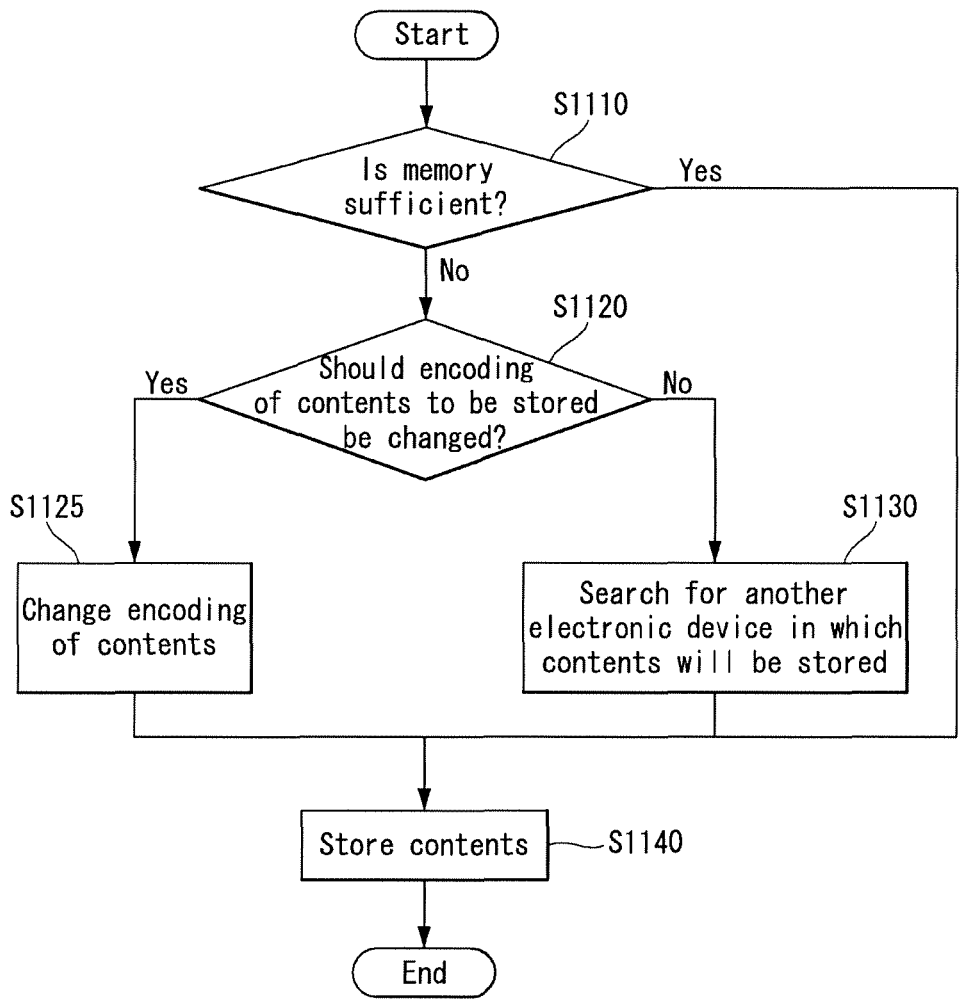
FIG. 9 is a flowchart illustrating a method of storing contents received using the time shift function illustrated in FIG. 8.

Storing the contents (S760) is described in detail with reference to FIGS. 9 and 10. FIG. 9 illustrates a time shift function, specifically a contents play table and a contents storage table. FIG. 10 is a flowchart illustrating a method of storing received contents using the time shift function according to an embodiment of the present invention.

Figure 8:
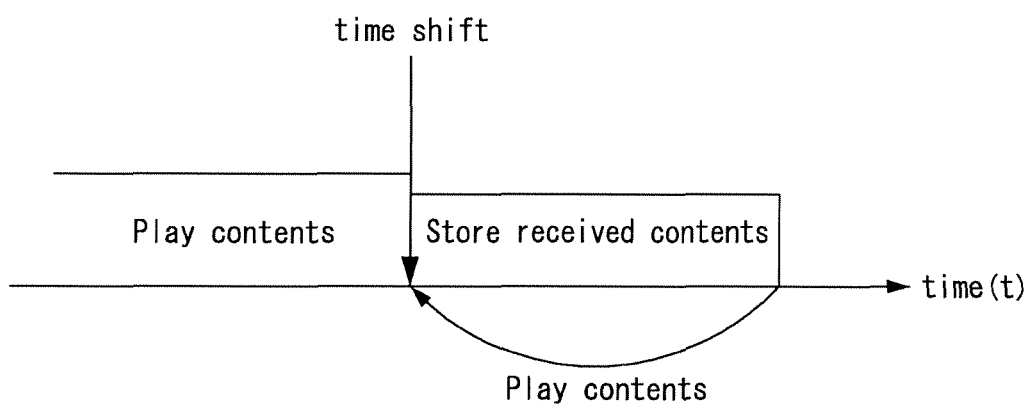
FIG. 8 illustrates a time shift function according to the present invention.

Referring to FIG. 8, the time shift function stores real-time streaming contents and plays the stored contents after the lapse of a predetermined time. The time shift function may be an example of a bookmark generating command for bookmarking the currently played contents.

As illustrated in FIG. 9, the controller 180 of the first TV 17 checks whether the remaining storage space of the memory 160 is sufficient (S1110). The controller 180 determines that the remaining storage space of the memory 160 is insufficient when the remaining storage space of the memory is smaller than a predetermined size or smaller than a capacity required to store the rest of the contents that have not yet been received.

For example, if the quantity of the rest of the contents received from the external device of the network 1 corresponds to 20 minutes and the memory 160 cannot store the rest of the contents corresponding to 20 minutes, the controller 180 determines that the remaining storage space of the memory is insufficient. The quantity of the rest of the contents may be obtained by excluding the quantity of contents that have already been played from the entire play time of the metadata of the contents.

The controller 180 determines whether encoding of the contents being received is changed (S1120) when the controller determines that the remaining storage space of the memory 160 is insufficient. The user may also arbitrarily determine whether the encoding is changed.

When the controller 180 determines that the encoding of the contents is changed, the controller 180 changes the encoding such that the contents can be stored in the remaining storage space of the memory 160 (S1125). The controller 180 may control the extent of the change of the encoding in stages such that the quantity of contents stored in the memory decreases as the remaining storage space of the memory 160 decreases. Encoding information may include at least resolution or a bit rate. The controller 180 may store the changed encoding information.

When the controller 180 determines that the encoding of the contents is not changed and the remaining storage space of the memory 160 is insufficient, the controller 180 searches for a substitute storage space for storing the contents (S1130). For example, the controller 180 may transmit a command for inquiring of another electronic device about the remaining storage space of a memory of the other electronic device and determine the substitute storage space based on a response to the transmitted command. The controller 180 can determine an electronic device with a memory having the largest remaining storage space as the substitute storage space.

After either changing the encoding (S1125) or searching for a substitute storage space (S1130), the controller 180 stores the contents in the memory 160 or the storage space of the searched electronic device (S1140). In the embodiment illustrated in FIGS. 8 and 9, when the first TV 17 generates the bookmark with respect to the contents when the reproduction point state variable cannot be obtained, the first TV can store contents received after the generation of the bookmark is requested.

Referring again to FIG. 7, the first TV 17 generates the bookmark even when the first TV cannot obtain the reproduction point state variable (S770). The generation of the bookmark corresponds to the previously explained operation (S750) so that explanation is omitted.

The first TV 17 may obtain the contents title from the EPG. The first TV 17 may obtain other information used for generating the bookmark in a similar manner as previously explained.

The first TV 17 may generate the contents identifier for identifying the stored contents. For example, the first TV 17 can generate the contents identifier based on at least channel information or broadcasting time when the stored contents correspond to a broadcasting signal. The contents identifier may have a structure of "CH9(channel information)//14:13: 00 (broadcasting time)."

The first TV 17 may obtain the storage position information of the stored contents. When the contents are stored in the first TV 17, the contents storage position may include information "First TV//contents\." When the received contents are stored in a substitute electronic device, such as the first computer 13, the contents storage position may include information "First computer//contents\." The first TV 17 may include the contents stored according to the time shift function in the generated bookmark.

The bookmark with respect to the currently output contents can be generated according to the embodiment explained with reference to FIGS. 7-9. FIG. 10 illustrates exemplary bookmarks generated according to an embodiment of the present invention. Bookmark (a) and bookmark (b) illustrated in FIG. 10 are an exemplary structure of the generated bookmark when the reproduction point state variable can be obtained and bookmark (c) and bookmark (d) illustrated in FIG. 10 are an exemplary structure of the generated bookmark when the reproduction point state variable cannot be obtained.

The generated bookmark may include a bookmark storage position that represents the position where the bookmark is stored. For example, the bookmark storage position can represent a container of an electronic device that stores the generated bookmark such that the bookmark storage position represents where the generated bookmark is stored.

The bookmark storage position may include information about the identifier of the electronic device storing the bookmark and a folder storing the generated bookmark. If the electronic device storing the bookmark corresponds to the first TV 17, the information about the bookmark storage position may have a structure "First TV(identifier of the electronic device storing the bookmark)//bookmark\(folder storing the generated bookmark)."

The controller 180 may embed the received event related information in the generated bookmark. When the event related information is embedded in the generated bookmark, the user can be made aware of the reason for the generation of the bookmark.

The bookmark (a) illustrated in FIG. 10 may include at least a reproduction point state variable, a rendering state variable, a contents identifier, a bookmark identifier, a bookmark title, a contents title, a contents storage position, a bookmark storage position, or the identifier of an electronic device that will output bookmarked contents. The bookmark (b) illustrated in FIG. 10 may include contents access information as well as at least a reproduction point state variable, a rendering state variable, a contents identifier, a bookmark identifier, a bookmark title, a contents title, a contents storage position, a bookmark storage position, or the identifier of an electronic device that will output bookmarked contents.

The contents access information may include information required for the controller 180 to access the contents. For example, the contents access information may include at least an ID and password required to access the contents server 28 and the external server 4. For example, the contents access information may include "Darling0206(ID)//tkfkdgo(password)."

The contents access information automatically accesses the contents server 25 and/or the external server 4 when the user wants to enjoy the contents based on the generated bookmark. The contents access information may be encoded such that people other than the user cannot see the contents access information. The controller 180 of the first TV 17 may obtain the contents access information via a user input, for example.

The bookmarks (a), (b), (c) and (d) illustrated in FIG. 10 may further include contents encoding information. The contents encoding information may represent how the contents are encoded. For example, the contents encoding information may include at least a bit rate or resolution. The function of the contents encoding information will be described later.

The bookmarks (a), (b), (c) and (d) illustrated in FIG. 10 may further include information related to the generation of the bookmark. For example, the bookmarks (a), (b), (c) and (d) may further include at least bookmark generating time or the identifier of the electronic device generating the bookmark. The information included in bookmarks (a), (b), (c) and (d) may be used as information provided to the user via a user interface that will be described later.

Referring back to FIG. 6, the generated bookmark is stored by the first device (S620). The generated bookmark can be stored in at least the player 29 playing contents, the server 25 providing contents, or the electronic device administrating the network 1. That is, the first TV 17 that generates the bookmark can store the bookmark in at least the player 29, the server 25, or the electronic device administrating the network 1.

The player 29 may correspond to at least an electronic device having a contents playing function or an electronic device outputting the contents. The contents providing server 25 may be the electronic device that provides the contents to the first TV 17. That is, the server 25 may be included in the network 1 or located outside the network.

Information related to the generated bookmark (bookmark related information) is transmitted to another electronic device by the first electronic device (S625). The sharing may be performed by at least the first TV 17 that generates the bookmark or the electronic device that stores the generated bookmark.

When the generated bookmark is stored in the first TV 17, the information related to the generated bookmark (bookmark related information) can be automatically shared by another electronic device. Furthermore, even when the generated bookmark is stored in the server 25, the bookmark related information can be automatically shared by another electronic device, such as the first TV 17.

The shared bookmark related information may be the entire bookmark or may correspond to some information included in the generated bookmark. For example, the shared bookmark related information can include minimum information for identifying the generated bookmark. The minimum information for identifying the generated bookmark may correspond to the bookmark identifier and the bookmark storage position. The bookmark related information may further include information other than the minimum information.

Additionally, the shared bookmark related information may include minimum information for re-outputting the bookmarked contents. The minimum information for re-outputting the bookmarked contents may include at least the contents identifier, the contents storage position, or the reproduction point state variable. The bookmark related information may further include information other than the minimum information.

If the generated bookmark is stored in the first TV 17, the generated bookmark or some information of the generated bookmark is shared by another electronic device such that the other electronic device can re-output the contents based on the generated bookmark. For example, the first TV 17 can transmit the entire bookmark to the other electronic device such that the other electronic device can play the contents based on the generated bookmark. Furthermore, the first TV 17 can transmit the bookmark identifier and the bookmark storage position of the generated bookmark to the other electronic device such that the other electronic device can play the contents based on the generated bookmark via the electronic device storing the bookmark.

Even when the generated bookmark is stored in the server 25 that provides the contents, the entire or some information of the generated bookmark can be shared by the other electronic device such that the other electronic device can re-output the contents based on the generated bookmark. When the generated bookmark is stored in the server 25 that provides the contents, the bookmark identifier and the bookmark storage position designated to the server are transmitted to the other electronic device such that the other electronic device can request the server to provide the bookmarked contents.

Accordingly, a transmission bandwidth can be reduced compared to when the entire bookmark is transmitted. The bookmark related information may be shared by an electronic device designated to the same user of the electronic device that generates the bookmark.

Figures 11, 12:
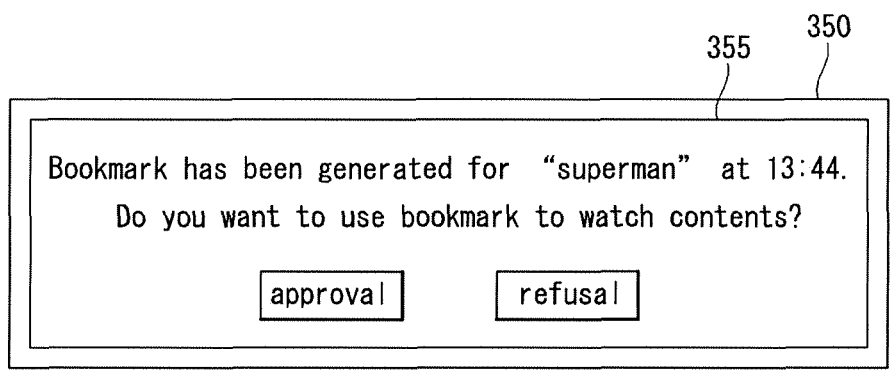
FIG. 11 illustrates user designation of electronics devices according to an embodiment of the present invention.
FIG. 12 illustrates a user interface according to an embodiment of the present invention.

FIG. 11 illustrates user designation according to an embodiment of the present invention. An arbitrary electronic device may be designated to multiple users or a specific user. As illustrated in FIG. 11, the first computer 13, the first TV 17, and the first mobile terminal 21 are designated to user 1 and the second computer 15, the second TV 19, and the second mobile terminal 23 are designated to user 2.

If the generated bookmark is stored in the first TV 17 that generates the bookmark, the first TV can transmit the bookmark related information to at least the first computer 13 or the first mobile terminal 21 designated to the user of the first TV. If the bookmarked contents are stored in the electronic device that provides the contents to the first TV 17, the first TV or the electronic device that provides the contents to the first TV can transmit the bookmark related information to the first computer 13, the first TV, and the first mobile terminal 21.

Although the generated bookmark is automatically shared by the other electronic device in the above-described embodiment, the generated bookmark may be shared by an electronic device in which an operation signal is generated. The operation signal may be a signal representing that the user is using an electronic device other than the first TV 17 that is playing the contents. That is, when the operation signal is generated in an electronic device, it can be considered that the user is using the electronic device.

The operation signal may be generated when the electronic device other than the first TV 17 is turned on, when mute of the electronic device is cancelled, and when a contents playing application program is executed. Furthermore, the operation signal may be specialized according to electronic device type. In the case of the first and second mobile terminals 21 and 23, starting a call, ending a call, and conversion to a standby mode may correspond to the operation signal. In the case of the first and second computers 13 and 15, user inputs applied to the first and second computers may correspond to the operation signal.

The electronic device in which the operation signal is generated may notify another electronic device of the generating. For example, the electronic device in which the operation signal is generated notifies the electronic device that administrates the network 1 that the operation signal is generated. Furthermore, the electronic device in which the operation signal is generated can inform electronic devices designed to the same user of the electronic device that the operation signal is generated.

Accordingly, if the generated bookmark is stored in the first TV 17, the first TV can transmit the bookmark related information, such as the generated bookmark or some information of the generated bookmark, to the first mobile terminal 21 when the operating signal is generated in the first mobile terminal designated to the user of the first TV 17. The first TV 17 transmits the bookmark related information to electronic devices designated to the same user of the first TV even when the electronic devices do not request the first TV to transmit the bookmark related information such that the user can enjoy the bookmarked contents even via the electronic device in which the operation signal is generated.

The first TV 17 can transmit the bookmark related information via different methods depending on the types of other electronic devices. For example, the first TV 17 can transmit the bookmark related information via a wired/wireless communication network if the electronic devices correspond to a computer and a TV. Furthermore, the first TV 17 can transmit the bookmark related information via a wired/wireless communication network or a mobile communication network if the electronic devices include a mobile terminal. For example, the controller 180 can transmit the bookmark related information in the form of SMS or MMS to the mobile terminal when the mobile communication network is used.

Referring back to FIG. 6, a user interface for inquiring about whether to use the bookmark when the operation signal is generated (S630). As described above, the bookmark related information can be automatically shared by another electronic device irrespective of whether the operation signal is generated in the other electronic device.

The operation signal may be generated from an electronic device that receives the bookmark related information. The operation signal has previously been described so no further explanation is provided.

The electronic device in which the operation signal is generated can provide a user interface for inquiring of the user about whether the user wants to use the generated bookmark. It is assumed that the electronic device in which the operation signal is generated is the first mobile terminal 21. When an operation signal corresponding to ending a call is generated in the first mobile terminal 21, for example, the first mobile terminal can output a user interface based on the received bookmark related information.

FIG. 12 illustrates a user interface 355 according to an embodiment of the present invention. The user interface 355 may include bookmark description information for inquiring about whether the user wants to use the bookmark.

The bookmark description information may include at least the title of the bookmarked contents, the bookmark title, bookmark generating time, the identifier of the electronic device storing the contents, the contents storage position, the contents identifier for identifying the bookmark, the bookmark identifier for identifying the bookmarked contents, the bookmark storage position, or the identifier of the electronic device generating the bookmark. The user is informed of the electronic device generating the bookmark via the identifier of the electronic device generating the bookmark.

The controller 380 of the first mobile terminal 21 can obtain the bookmark description information via at least the bookmark related information or separate information. If first mobile terminal 21 receives the generated bookmark, the first mobile terminal can obtain the bookmark description information based on the received bookmark.

If the first mobile terminal 21 receives part of the bookmark related information, the first mobile terminal can request the electronic device storing the bookmark to transmit the bookmark description information to the first mobile terminal. When the first mobile terminal 21 receives information about the bookmark identifier and the bookmark storage position, for example, the first mobile terminal can transmit the bookmark identifier to the electronic device corresponding to the bookmark storage position in order to receive the description information associated with the bookmark identified by the bookmark identifier.

The controller 380 of the first mobile terminal 21 can output the user interface 355 via the output unit 350 at an appropriate time. The controller 380 of the first mobile terminal 21 can output the user interface 355 right after receiving the bookmark related information. For example, the first mobile terminal 21 can provide the user interface 355 when the bookmark related information is received and a contents playing application program corresponding to an operation signal is executed.

Furthermore, the controller 380 of the first mobile terminal 21 can provide the user interface 355 when an operation signal is generated, the bookmark related information is received and then another operation signal is generated. For example, the first mobile terminal 21 can receive the bookmark related information after being powered-on and output the user interface 355 after the contents playing application program is executed.

The controller 380 of the first mobile terminal 21 can inform the user while providing the user interface 355. For example, the controller 380 of the first mobile terminal 21 can make the display unit 351 luminous or output an alarm sound via the audio output unit 352.

The user can operate the user interface 355 via the input unit 320 (S640). The user can select an icon corresponding to "approval" or an icon corresponding to "refusal" via the input unit 320, such as via a remote controller or a keyboard. The controller 380 of the first mobile terminal 21 plays the contents based on the bookmark related information (S650) when the user selects the icon corresponding to "approval".

The first mobile terminal 21 in which the operation signal is generated can request the contents based on the received bookmark related information. The first mobile terminal 21 can request the electronic device storing the generated bookmark or the electronic device storing the contents to transmit the bookmarked contents.

When the first mobile terminal 21 receives the entire bookmark, for example, the first mobile terminal detects the electronic device in which the bookmarked contents are stored based on the received contents storage position and requests the detected electronic device to provide the bookmarked contents. The first mobile terminal 21 may receive the bookmarked contents starting at the bookmarked reproduction point from the electronic device storing the bookmarked contents by transmitting the contents identifier for identifying the bookmarked contents and the reproduction point state variable to the electronic device.

When the first mobile terminal 21 receives the bookmark identifier and the bookmark storage position, for example, the first mobile terminal may detect the electronic device storing the generated bookmark based on the bookmark storage position and transmit the bookmark identifier to the detected electronic device. The electronic device receiving the bookmark identifier may search for the bookmark identified by the bookmark identifier and transmit the bookmarked contents to the first mobile terminal 21 based on the contents identifier, the contents storage position and the reproduction point state variable stored in the searched bookmark.

When the bookmark searched based on the bookmark identifier bookmarks contents stored in an electronic device, another electronic device that receives the bookmark identifier can request the electronic device storing the contents based on the contents storage position to provide the bookmarked contents. Furthermore, the electronic device receiving the bookmark identifier can request the electronic device storing the contents to transmit the bookmarked contents to the first mobile terminal 21 based on the reproduction point state variable.

Figure 13:
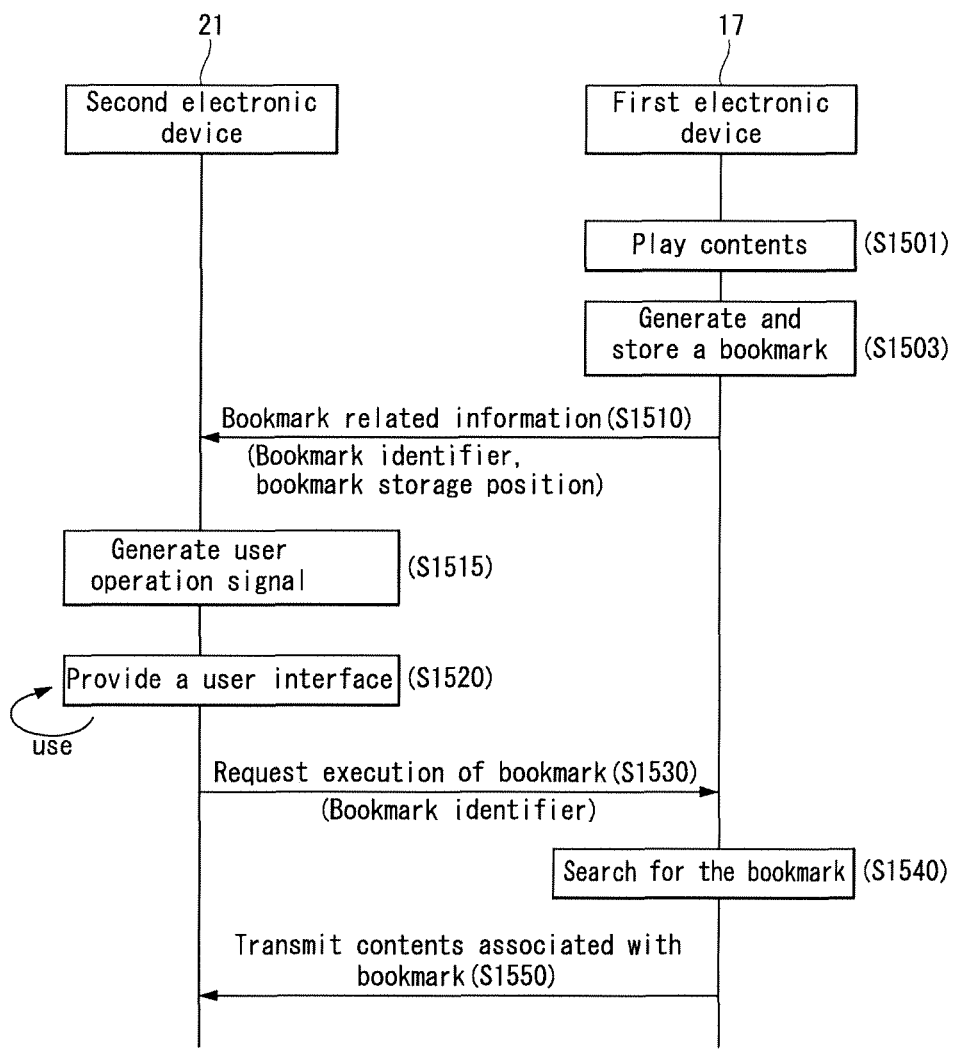
FIG. 13 is a flowchart illustrating a method of generating a bookmark and using the generated bookmark according to an embodiment of the present invention.
Figure 14:
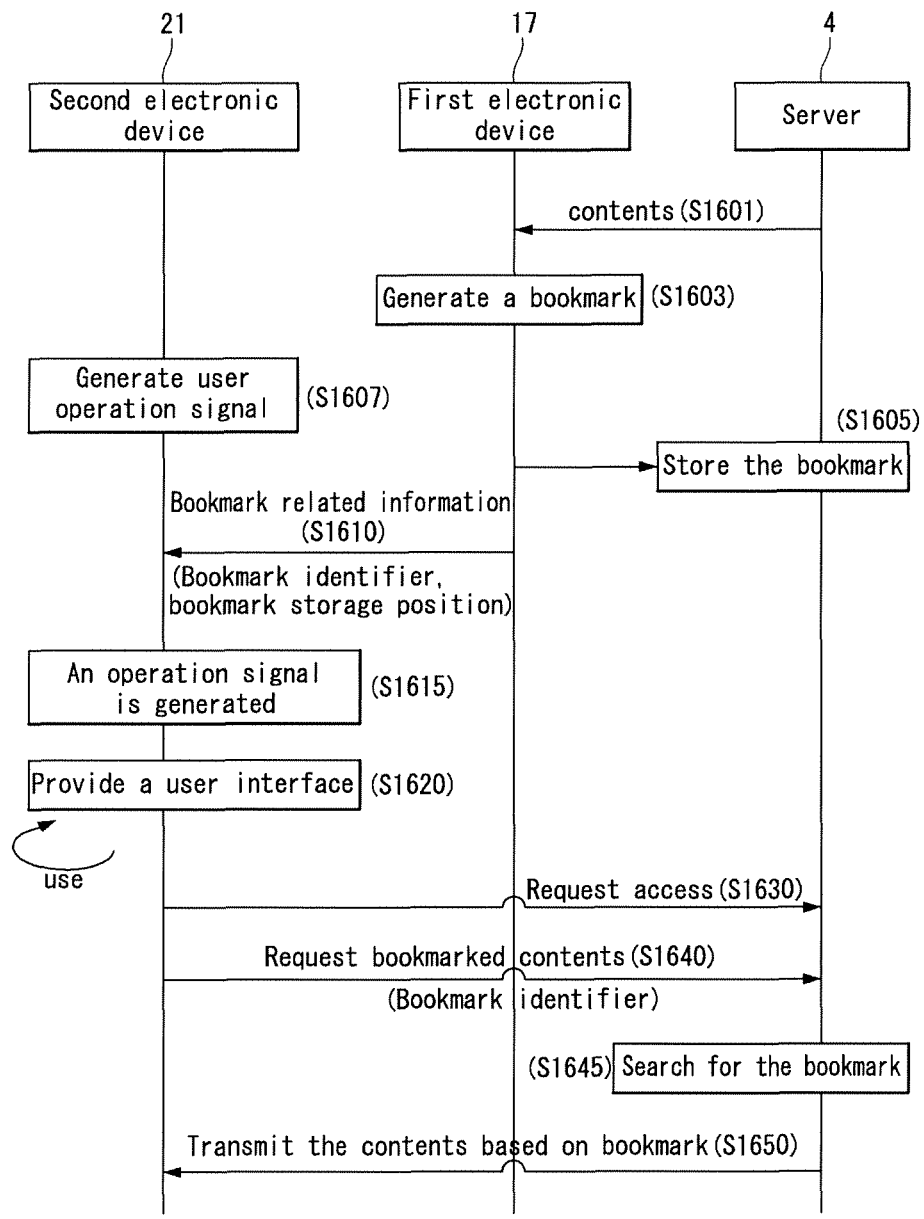
FIG. 14 is a flowchart illustrating a method of generating a bookmark and using the generated bookmark according to another embodiment of the present invention.

FIGS. 13 and 14 illustrate methods of generating a bookmark and transmitting contents based on bookmark related information according to embodiments of the present invention. It is assumed that a first electronic device in FIGS. 13 and 14 corresponds to the first TV 17 and a second electronic device in FIGS. 13 and 14 corresponds to the first mobile terminal 21. However, the present invention is not limited thereto. The methods illustrated in FIGS. 13 and 14 will be described with reference to FIG. 6.

The first electronic device, specifically the first TV 17, plays contents via the output unit 150 (S1501). It is assumed that the contents are stored in the memory 160 of the first TV 17.

The first TV 17 generates and stores a bookmark when receiving a bookmark generating command while playing the contents (S1503). The first TV 17 can generate a bookmark with respect to the currently played contents when receiving the bookmark generating command. Furthermore, the first TV 17 can store the generated bookmark in the memory 160 of the first TV.

The first TV 17 shares information related to the generated bookmark with the first mobile terminal 21 (S1510) that is designated to the user of the first TV 17. It is assumed that the shared bookmark related information includes the bookmark identifier and bookmark storage position.

The second electronic device, specifically, the first mobile terminal 21, generates a user operation signal (S1515). The first mobile terminal 21 provides the user interface 355 for inquiring about whether the user wants to use the generated bookmark (S1520). The user can select the use of the bookmark via the user interface 355 provided by the first mobile terminal 21.

The first mobile terminal 21 transmits a bookmark execution request to the first TV 17 based on at least the bookmark storage position or the bookmark identifier (S1530). For example, the first mobile terminal 21 can detect that the bookmark is stored in the first TV 17 based on the bookmark storage position and request the first TV to execute the bookmark identified by the bookmark identifier.

The first TV 17 searches for the bookmark based on the bookmark identifier (S1540). For example, the first TV 17 can search the memory 160 and/or other electronic devices for the bookmark having the bookmark identifier.

The first TV 17 transmits contents associated with the bookmark to the first mobile terminal 21 based on the searched bookmark (S1550). The first TV 17 can identify the bookmarked contents based on a contents identifier included in the searched bookmark. Furthermore, the first TV 17 can transmit the bookmarked contents to the first mobile terminal 21 based on at least a reproduction point state variable or a rendering state variable included in the bookmark. In this way, the first mobile terminal 21 can output the contents from the point bookmarked by the first TV 17.

A method of receiving contents based on a bookmark will be explained with reference to FIG. 14. The method shown in FIG. 14 is performed on the assumption that an electronic device that outputs contents is different from an electronic device that provides the contents.

The first TV 17 receives contents from a server and outputs the received contents via the output unit 150 (S1601). The server may be the contents server 25 and/or the external server 4. It is assumed that the server is the external server 4.

The first TV 17 generates a bookmark for bookmarking the contents while playing the contents (S1603). The first TV 17 stores the generated bookmark in the external server 4 that provides the contents (S1605). Additionally, the first TV 17 may store the generated bookmark or only some information related to the generated bookmark in its memory 160.

The first mobile terminal generates a user operation signal (S1607), such as a text confirmation signal. The first mobile terminal 21 may inform the first TV 17 that the user operation signal is generated.

The first TV 17 transmits bookmark related information including a bookmark identifier and bookmark storage position to the first mobile terminal 21 when informed that the user operation signal is generated (S1610). Alternatively, the first TV 17 may instruct the external server 4 to transmit the bookmark related information to the first mobile terminal 21 when informed that the user operation signal is generated.

When only some information of the generated bookmark is stored in the first TV 17 and the entire generated bookmark is stored in the external server 4, the external server can share the generated bookmark with the first mobile terminal 21. When the first TV 17 stores the bookmark identifier and the bookmark storage position and the external server 4 stores the bookmark, the first TV can request the external server to transmit the bookmark related information to the first mobile terminal 21.

When an operation signal is generated in the first mobile terminal 21 (S1651), for example, when a playing application program execution request is input to the first mobile terminal after the bookmark related information is received, the first mobile terminal 21 provides a user interface for inquiring about whether the user wants to use the generated bookmark (S1620). It is assumed that the use of the bookmark is selected via the user interface provided by the first mobile terminal 21.

The first mobile terminal 21 transmits an access request to the external server 4 (S1630). The first mobile terminal 21 can determine that the bookmark is stored in the external server 4 based on the received bookmark storage position.

The first mobile terminal 21 can transmit the access request including access information required to access the external server 4, such as an ID and a password. Since the ID and the password are included in the bookmark related information and provided to the first mobile terminal 21, the first mobile terminal can obtain the access information via the received bookmark related information (S1610).

When the ID and the password are not required to access the external server 4, the first mobile terminal 21 can simply perform an access request. The first mobile terminal 21 can receive a signal indicating that access is successful from the external server 4.

The first mobile terminal 21 searches for the bookmarked contents based on the received bookmark identifier (S1645). The external server 4 transmits the searched contents to the first mobile terminal 21 based on the reproduction point state variable included in the bookmark (S1650).

The first mobile terminal 21 outputs the received contents. How the first mobile terminal 21 receives the contents based on the bookmark related information has been explained through the embodiments illustrated in FIGS. 13 and 14.

Figure 15:
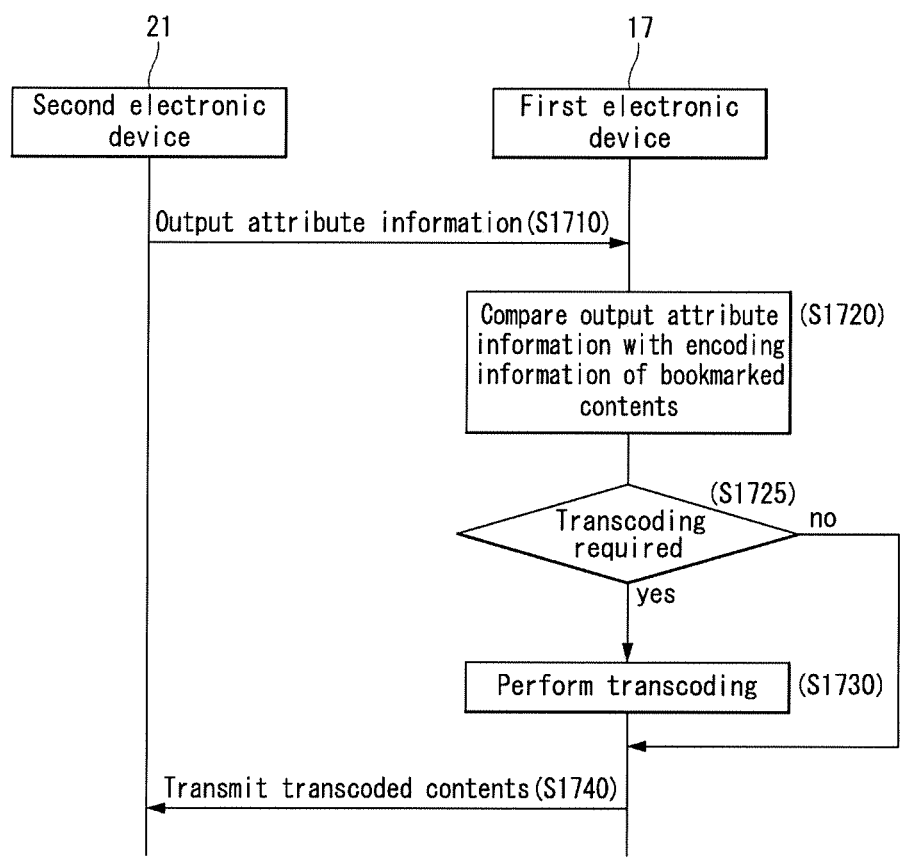
FIG. 15 is a flowchart illustrating transcoding according to an embodiment of the present invention.

A method of transcoding the bookmarked contents so that they may be played in the first mobile terminal 21 will now be explained. FIG. 15 is a flowchart illustrating transcoding according to an embodiment of the present invention.

As illustrated in to FIG. 15, the first TV 17 obtains output attribute information provided by the first mobile terminal 21 (S1710). The output attribute information may include at least the resolution or bit rate of contents supported by the first TV 17.

For example, the first TV 17 can obtain the output attribute information of the first mobile terminal 21 by acquiring device description information provided by the first mobile terminal. The device description information may include the resolution and bit rate information supported by the first mobile terminal 21.

Furthermore, the first TV 17 can obtain the output attribute information when receiving a bookmark execution request from the first mobile terminal 21. The bookmark execution request illustrated in FIG. 13 and the bookmark execution request illustrated in FIG. 14 may include the output attribute information of the first mobile terminal 21. The first TV 17 can obtain the output attribute information as separate information from the first mobile terminal 21.

The first TV 17 compares the output attribute information with encoding information of the bookmarked contents (S1720). The first TV 17 determines if transcoding is required (S1725).

The first TV 17 transcodes the bookmarked contents according to the output attribute information when the output attribute information of the first mobile terminal 21 is different from the encoding information of the bookmarked contents (S1730). The first TV 17 transmits the transcoded contents to the first mobile terminal 21 (S1740).

Furthermore, the first mobile terminal 21 can request the first TV 17 to perform the transcoding. For example, the first mobile terminal 21 can obtain the encoding information of the bookmarked contents. The encoding information of the bookmarked contents may be included in the bookmark related information and transmitted to the first mobile terminal 21 or transmitted in a different form to the first mobile terminal.

The first mobile terminal 21 can determine whether the transcoding is required based on the encoding information of the obtained bookmarked contents. The first mobile terminal 21 can request the first TV 17 to transcode the bookmarked contents when the first mobile terminal determines that the transcoding is required. For example, the first mobile terminal 21 can request the first TV 17 to transcode the bookmarked contents by providing information related to the transcoding, such as the resolution and bit rate, to the first TV 17.

The first mobile terminal 21 may perform the transcoding. The first mobile terminal 21 may obtain the encoding information of the bookmarked contents. The first TV 17 can include the encoding information of the bookmarked contents in the bookmark related information and transmit the bookmarked related information including the encoding information to the first mobile terminal 21. Otherwise, the first TV 17 can transmit the encoding information of the bookmarked contents in a different form to the first mobile terminal 21.

The first mobile terminal 21 can determine whether the transcoding is required based on the encoding information of the bookmarked contents. The first mobile terminal 21 can transcode the contents received from the first TV 17 when the first mobile terminal determines that the transcoding is required.

Referring back to FIG. 6, the first mobile terminal 21 can play the bookmarked contents (S650). The first mobile terminal 21 can automatically delete the received bookmark related information or request the first TV 17 to delete the generated bookmark (S660).

Specifically, the first mobile terminal 21 can automatically delete the bookmark related information after playing the contents based on the bookmark or the first TV 17 can automatically delete the bookmark after the bookmark is used. Furthermore, the first mobile terminal 21 can automatically instruct the first TV 17 to delete the bookmark. Moreover, the first mobile terminal 21 can automatically instruct the first TV 17 to delete the contents stored according to the time shift function.

When it is determined that the first mobile terminal 21 does not use the bookmark (S640), the first mobile terminal may automatically delete the bookmark related information. Furthermore, the first mobile terminal 21 may provide a user interface for inquiring about whether the bookmark should be deleted.

In the embodiment illustrated in FIG. 6, a first electronic device informs a second electronic device that a bookmark is generated in the first electronic device and the second electronic device plays contents based on the bookmark when receiving a user input with respect to the use of the bookmark. Accordingly, the user can enjoy contents seamlessly using an electronic device.

Figure 16:
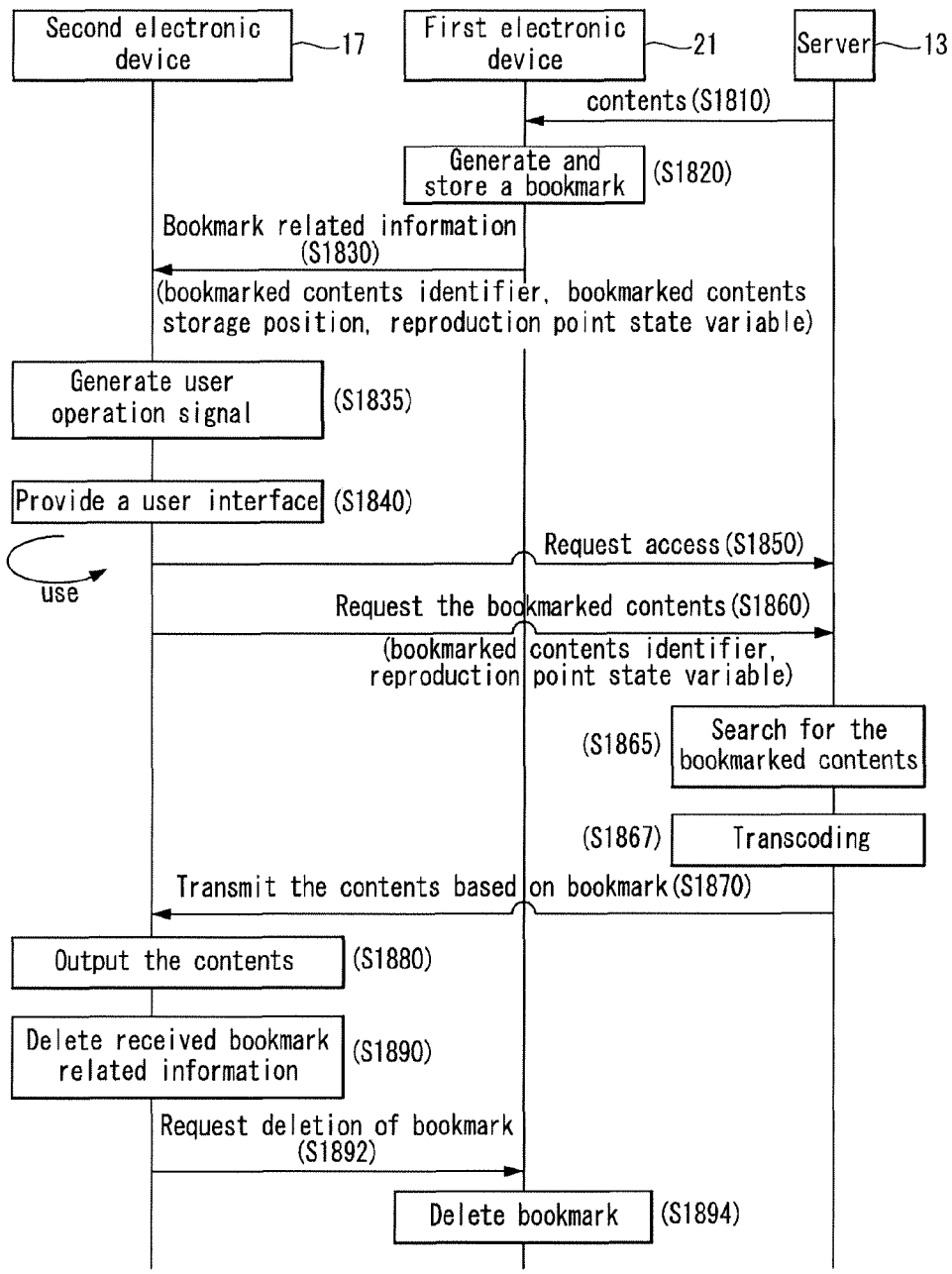
FIG. 16 is a flowchart illustrating a method of using a bookmark according to an embodiment of the present invention.

FIG. 16 illustrates a flowchart of a method of using a bookmark according to an embodiment of the present invention. As illustrated in FIG. 16, a first electronic device receives contents from a server and outputs the received contents (S1810). It is assumed that the first electronic device is the first TV 17, the server is the first computer 13 as an example of the contents server 4, and the second electronic device is the first mobile terminal 21.

The first TV 17 generates a bookmark with respect to the contents (S1820). The user can generate the bookmark while watching the contents via the first TV 17.

The first TV 17 transmits information related to the generated bookmark to the first mobile terminal 21 (S1830). The bookmark related information may include the contents identifier, the contents storage position, and the reproduction point state variable. The bookmark related information may include further information.

A user operation signal is generated in the first mobile terminal 21 after receiving the bookmark related information (S1835). The user operation signal may be generated in the first mobile terminal 21 when the user uses the first mobile terminal. For example, the user may watch the contents via the TV 17 before leaving with the first mobile terminal 21.

The first mobile terminal 21 provides a user interface for inquiring about whether the user wants to use the bookmarked contents when the user operation signal is generated (S1840). The user interface may include at least the contents title, the bookmark title, bookmark generating time, the name of the electronic device storing the bookmarked contents, or the identifier of the electronic device generating the bookmark in order to provide bookmark information to the user. The user can determine whether or not to use the bookmark based on the information included in the user interface.

The first mobile terminal 21 transmits an access request to the first computer 13 upon receiving a user input indicating a desire to use the bookmark via the user interface (S1850). The first mobile terminal 21 may recognize that the bookmarked contents are stored in the first computer 13 based on the received contents storage position before transmitting the access request. In this way, the first mobile terminal 21 can obtain the bookmarked contents from the first computer 13.

When the first mobile terminal 21 transmits the access request to the first computer 13 (S1850), the first computer 13 may inform the first mobile terminal 21 that the access is successful. The first mobile terminal 21 requests the first computer 13 to provide the bookmarked contents after accessing the first computer (S1860). For example, the first mobile terminal 21 may transmit the contents identifier and the reproduction point state variable included in the received bookmark related information to the first computer 13.

The first computer 13 searches for the bookmarked contents based on the contents identifier (S1865). The first computer 13 transcodes the searched contents before transmitting the searched contents to the first mobile terminal 21 (S1867). The first computer 13 may transcode the contents according to the previously described method.

The first computer 13 transmits the transcoded contents to the first mobile terminal 21 (S1870). The first computer 13 may transmit the searched contents to the first mobile terminal 21 based on the reproduction point state variable obtained when the mobile terminal requests the bookmarked contents.

The first mobile terminal 21 outputs the contents received from the first computer 13 via the output unit 350 (S1880). In this way, the user can seamlessly watch the contents that have been watched via the first TV 17 using the first mobile terminal 21.

The first mobile terminal 21 automatically deletes the bookmark related information (S1890). The first mobile terminal 21 automatically requests the first TV 17 to delete the bookmark (S1892). The first TV 17 deletes the bookmark according to the bookmark deletion request (S1894).

Figure 17:
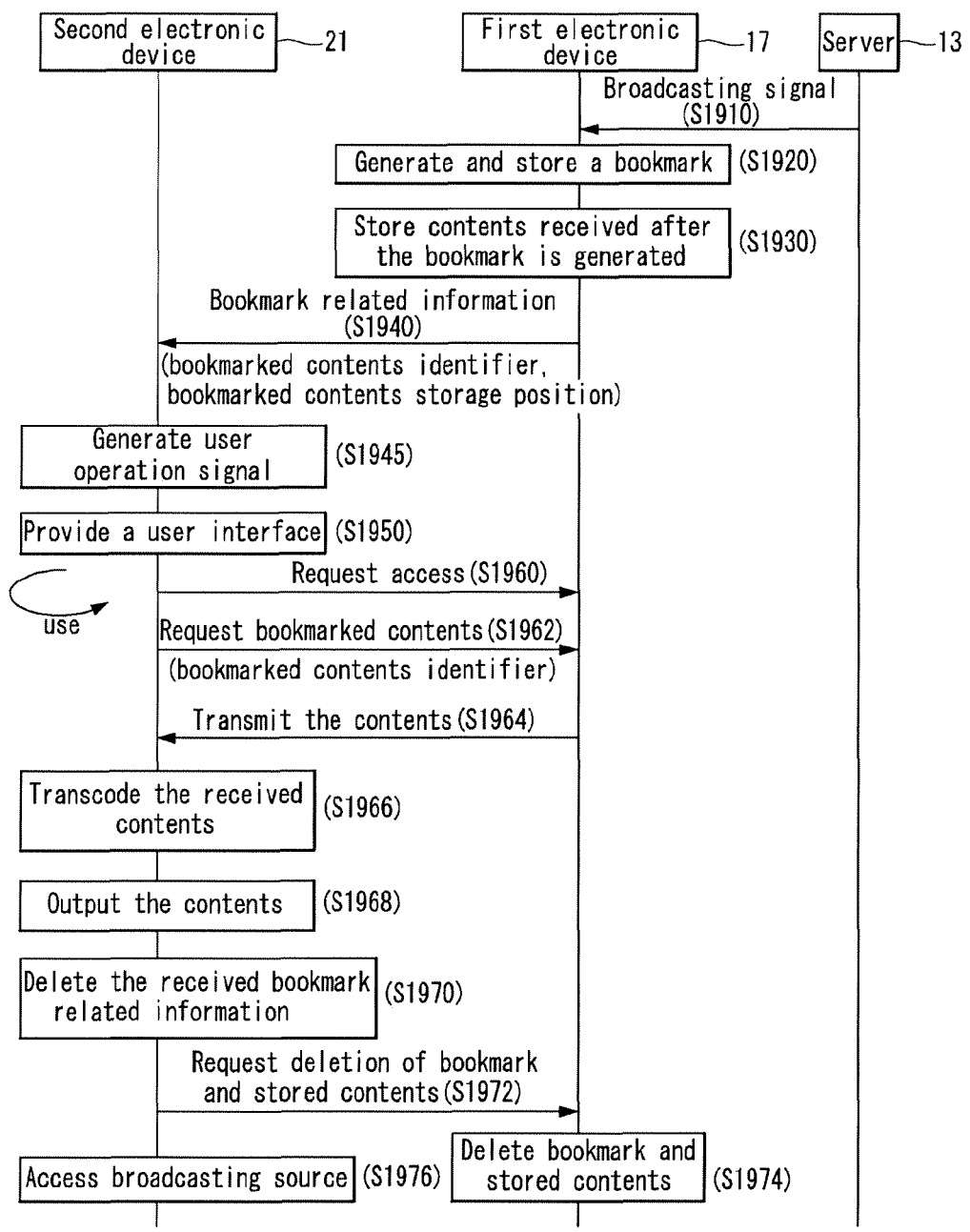
FIG. 17 is a flowchart illustrating a method of using a bookmark according to another embodiment of the present invention.

FIG. 17 illustrates a flowchart of a method of using a bookmark according to another embodiment of the present invention. As illustrated in FIG. 17, the first TV 17 plays contents (S1910). The first TV 17 may receive a broadcasting signal as the contents from a broadcasting station and output the received broadcasting signal.

The user generates a bookmark with respect to the currently played contents via the input unit 120 and stores the bookmark (S1920). The first TV 17 may generate the bookmark and store the bookmark in the memory 160. It is assumed that the generated bookmark corresponds to bookmark (c) illustrated in FIG. 10.

The first TV 17 stores contents received after a bookmark generating command is received by using the time shift function illustrated in FIG. 8 (S1930). The first TV 17 may store the received contents for a predetermined time until a contents storage completing signal is received or until a time when the received contents are used.

The first TV 17 automatically transmits information related to the bookmark to the first mobile terminal 21 (S1940). The first TV 17 may provide the identifier of the bookmarked contents and storage position of the bookmarked contents to the first mobile terminal 21.

The first TV 17 may transmit the bookmark related information to other electronic devices designated to the user who generates the bookmark as well as to the first mobile terminal 21. The bookmark related information may include information in addition to the bookmarked contents identifier and the bookmarked contents storage position. Furthermore, the first TV 17 may transmit the bookmark related information to the first computer 13.

An operation signal is generated in the first mobile terminal 21 (S1945). When the operation signal is generated in the first mobile terminal 21, the first mobile terminal provides a user interface for inquiring about whether the user wants to use the bookmark (S1950).

The first mobile terminal 21 transmits an access request to the first computer 13 upon receiving a user input indicating a desire to use the bookmark via the user interface (S1960). This operation corresponds to the same operation (S1850) illustrated in FIG. 16 so no further explanation is provided.

The first mobile terminal 21 requests the first TV 17 to provide the bookmarked contents (S1962). The first mobile terminal 21 may provide the bookmark contents identifier to the first TV 17.

The first TV 17 searches for the stored contents (S1930) based on the contents identifier received from the first mobile terminal 21 and transmits the searched contents to the first mobile terminal 21 (S1964). The first TV 17 finishes storing the contents after transmitting the searched contents to the first mobile terminal 21.

The first mobile terminal 21 may transcode the contents received from the first TV 17 (S1966). The first mobile terminal 21 may not transcode the contents upon determining that transcoding is not required. The transcoding may be performed according to the previously described method.

The first mobile terminal 21 outputs the contents via the output unit 350 (S1968). In this way, the user can continuously watch the broadcasting contents that have been watched via the first TV 17 using the first mobile terminal 21.

The first mobile terminal 21 may delete the bookmark related information and request that the first TV 17 delete the bookmark (S1970). This operation corresponds to the same operation (S1890-S1894) illustrated in FIG. 16 so no further explanation is provided.

The first mobile terminal 21 accesses the source of the broadcasting signal after all the stored contents are played (S1976). The broadcasting signal source may be provided to the first mobile terminal 21 from the first TV 17. For example, the broadcasting signal source may be included in the bookmark related information transmitted to the first mobile terminal 21 from the first TV 17 (S1940). The first mobile terminal 21 can receive the broadcasting signal via the broadcasting receiving module 331 in order to continuously provide the broadcasting signal to the user. Accordingly, when the user generates a bookmark while enjoying contents via an electronic device before using another electronic device, the user can seamlessly enjoy the contents via the other electronic device based on the generated bookmark.

The disclosed embodiments in this document may be combined in various manners. For example, embodiments of transmitting information on various structures of generated bookmarks, information on bookmark storage positions, and bookmark related information may be combined in various manners.

The electronic device control method according to the present invention can be written as computer programs and implemented in digital computers that execute the programs using a computer readable recording medium. The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

The electronic device control method according to embodiments of the present invention can be executed via software. The software can include code segments that perform required tasks. Programs or code segments can also be stored in a processor readable medium and transmitted.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the present invention, information related to a bookmark generated in an electronic device is received and bookmarked contents are provided based on the bookmark related information when an operation signal is generated in order to improve user convenience. Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, and pointing devices) can be coupled to the system either directly or through intervening I/O controllers. Network adapters (e.g., modem, cable modem, Ethernet cards) may also be coupled to the system to enable the data processing system to be coupled to other data processing systems or remote printers or storage devices via intermediate private or public networks.

It should be understood that the logic code, programs, modules, processes, methods, and the order in which the respective elements of each method are performed are purely exemplary. Depending on the implementation, the elements may be performed in any order or in parallel, unless indicated otherwise in the present disclosure. Further, the logic code is not related, or limited, to any particular programming language, and may be comprise one or more modules that execute on one or more processors in a distributed, non-distributed, or multiprocessing environment.

The methods as described herein may be used in the fabrication of integrated circuit chips. The resulting integrated circuit chips can be distributed by the fabricator in raw wafer form such as a single wafer that has multiple unpackaged chips, as a bare die, or in a packaged form. In the latter case, the chip is mounted in a single chip package (such as a plastic carrier with leads that are affixed to a motherboard or other higher level carrier) or in a multi-chip package (such as a ceramic carrier that has either or both surface interconnections of buried interconnections).

The chip is then integrated with other chips, discrete circuit elements, and/or other signal processing devices as part of either an intermediate product, such as a motherboard, or an end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds, are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the disclosed structure as performing the recited functions and not only structural equivalents, but also equivalent structures.

What is claimed is:

1. A method for processing a bookmark in a first electronic device, the method comprising:
receiving information associated with the bookmark, wherein the information associated with the bookmark includes an identifier of the bookmark, an identifier of bookmarked content, a reproduction point state variable, a rendering state variable, and output attribute information,
wherein the rendering state variable includes information related to playback of the bookmarked content, and
wherein the output attribute information is provided by the first electronic device and includes at least resolution information or bit rate information;
comparing the received output attribute information to an encoding information of the bookmark content;
transcoding the bookmarked content if the received output attribute information is different from the encoding information;
monitoring whether an application program for playing the bookmarked content is executed in the first electronic device;
displaying a user interface for inquiring whether to use the bookmark if the application program for playing the bookmarked content is executed in the first electronic device;
receiving an input for a resume operation via the displayed user interface;
displaying the transcoded bookmarked content according to the input; and automatically deleting the information associated with the bookmark after playing the bookmark content;

wherein the bookmark is generated by a second electronic device, and wherein the bookmarked content is received from a third electronic device that stores specific content or from a fourth electronic device that stores the bookmark.

2. The method of claim 1, wherein the user interface is provided by an object including bookmark description information.

3. The method of claim 1, wherein the specific content is related to the generated bookmark and it is transcoded before it is received.

4. The method of claim 1, wherein each of the first electronic device, the second electronic device, the third electronic device and the fourth electronic device is a computer, a television, a cellular phone, a home appliance, a digital broadcasting terminal, a personal digital assistant (PDA), a portable multimedia player (PMP), a navigation system or a mobile internet device.

5. The method of claim 1, further comprising:

temporarily storing the bookmarked content in the first electronic device by:

determining whether a storage space of a memory in the first electronic device is sufficient to store the bookmarked content;

adjusting the received output attribute information such that the bookmarked content can be stored in the storage space of the memory if it is determined that the storage space of the memory in the first electronic device is not sufficient; and transcoding the bookmarked content based on the adjusted output attribute information.

6. A first electronic device for processing a bookmark, the first electronic device comprising:

a receiving unit configured to receive information associated with the bookmark, wherein the information associated with the bookmark includes an identifier of the bookmark, an identifier of bookmarked content, a reproduction point state variable, a rendering state variable, and output attribute information, wherein the rendering state variable includes information related to playback of the bookmarked content, and wherein the output attribute information is provided by the first electronic device and includes at least resolution information or bit rate information; and a processor configured to:

compare the received output attribute information to an encoding information of the bookmark content;

transcode the bookmarked content if the received output attribute information is different from the encoding information;

monitor whether an application program for playing the bookmarked content is executed in the first electronic device;

display a user interface for inquiring whether to use the bookmark if the application program for playing the bookmarked content is executed in the first electronic device;

process an input for a resume operation via the displayed user interface;

display the transcoded bookmarked content according to the input; and automatically delete the information associated with the bookmark after playing the bookmark content;

wherein the bookmark is generated by a second electronic device, and wherein the bookmarked content is received from a third electronic device that stores specific content or from a fourth electronic device that stores the bookmark.

7. The electronic device of claim 6, wherein the user interface is provided by an object including bookmark description information.

8. The electronic device of claim 6, wherein the specific content is related to the generated bookmark and it is transcoded before it is received.

9. The electronic device of claim 6, wherein each of the first electronic device, the second electronic device, the third electronic device and the fourth electronic device is a computer, a television, a cellular phone, a home appliance, a digital broadcasting terminal, a personal digital assistant (PDA), a portable multimedia player (PMP), a navigation system or a mobile internet device.

10. The electronic device of claim 6, further comprising a memory configured to temporarily store the bookmarked content in the first electronic device and wherein the processor is further configured to:

determine whether a storage space of a memory in the first electronic device is sufficient to store the bookmarked content;

adjust the received output attribute information such that the bookmarked content can be stored in the storage space of the memory if it is determined that the storage space of the memory in the first electronic device is not sufficient; and transcode the bookmarked content based on the adjusted output attribute information.

* * * * *